(12) United States Patent
Ge et al.

(10) Patent No.: US 12,132,589 B2
(45) Date of Patent: Oct. 29, 2024

(54) DATA SCRAMBLING METHOD AND RELATED DEVICE

(71) Applicant: HUAWEI TECHNOLOGIES CO., LTD., Guangdong (CN)

(72) Inventors: Shibin Ge, Shanghai (CN); Xiaoyan Bi, Shanghai (CN); Min Zhang, Shenzhen (CN); Xiaohan Wang, Shanghai (CN); Haicun Hang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 690 days.

(21) Appl. No.: 17/136,660

(22) Filed: Dec. 29, 2020

(65) Prior Publication Data

US 2021/0119836 A1   Apr. 22, 2021

Related U.S. Application Data

(63) Continuation of application No. PCT/CN2019/093637, filed on Jun. 28, 2019.

(30) Foreign Application Priority Data

Jun. 29, 2018   (CN) .......................... 201810698574.9

(51) Int. Cl.
*H04L 25/03* (2006.01)
*H04W 72/23* (2023.01)

(52) U.S. Cl.
CPC ....... *H04L 25/03866* (2013.01); *H04W 72/23* (2023.01)

(58) Field of Classification Search
CPC .......................... H04L 25/03866; H04W 72/23
See application file for complete search history.

(56) References Cited

U.S. PATENT DOCUMENTS

| | | | |
|---|---|---|---|
| 2014/0119266 A1 | 5/2014 | Ng et al. | |
| 2017/0079065 A1* | 3/2017 | Lyu | ........................ H04W 72/23 |
| 2018/0270799 A1* | 9/2018 | Noh | ........................ H04L 5/0094 |

(Continued)

FOREIGN PATENT DOCUMENTS

| | | |
|---|---|---|
| CN | 101827444 A | 9/2010 |
| CN | 103139868 A | 6/2013 |
| CN | 104322109 A | 1/2015 |

(Continued)

OTHER PUBLICATIONS

R1-1807130 Huawei "Discussion on the multi-TRP/panel transmission in NR" 3GPP WG1 #93 Busan May 21-25, 2018 (Year: 2018).*

(Continued)

*Primary Examiner* — Basil Ma
(74) *Attorney, Agent, or Firm* — Fish & Richardson P.C.

(57) ABSTRACT

Data scrambling methods and devices are provided in this disclosure. One method comprises: configuring, by a communications device, a plurality of scrambling identifiers associated with different downlink control information (DCI) configuration information, wherein the DCI configuration information is parameter information used to obtain a downlink control channel; and sending, by the communications device, the plurality of scrambling identifiers to a terminal device.

12 Claims, 12 Drawing Sheets

(56) References Cited

U.S. PATENT DOCUMENTS

| | | | | |
|---|---|---|---|---|
| 2020/0221432 | A1* | 7/2020 | Park | H04J 11/0053 |
| 2023/0019892 | A1* | 1/2023 | Gordaychik | H04L 5/0058 |

FOREIGN PATENT DOCUMENTS

| | | | |
|---|---|---|---|
| CN | 105577342 | A | 5/2016 |
| CN | 106411475 | A | 2/2017 |
| CN | 106416115 | A | 2/2017 |
| CN | 106973437 | A | 7/2017 |
| CN | 107431900 | A | 12/2017 |
| CN | 107926008 | A | 4/2018 |
| CN | 109802752 | A | 5/2019 |
| EP | 3281336 | A1 | 2/2018 |
| WO | 2016164069 | A1 | 10/2016 |
| WO | 2017049524 | A1 | 3/2017 |
| WO | 2017180348 | A1 | 10/2017 |

OTHER PUBLICATIONS

Qualcomm Incorporated, "P-RNTI PDSCH hopping," 3GPP TSG RAN WG1 Meeting #86, R1-166235, Gothenburg, Sweden, Aug. 22-26, 2016, 3 pages.

RAN WG 1, "LS on correction to RRC parameters for NR," 3GPP TSG RAN WG1 Meeting AH 1801, R1-1801281, Vancouver, Canada, Jan. 22-26, 2018, 4 pages.

3GPP TS 38.213 V15.1.0 (Mar. 2018), "3rd Generation Partnership Project; Technical Specification Group Radio Access Network; NR; Physical layer procedures for control (Release 15)," Mar. 2018, 77 pages.

3GPP TS 38.214 V15.1.0 (Mar. 2018), "3rd Generation Partnership Project; Technical Specification Group Radio Access Network; NR; Physical layer procedures for data (Release 15)," 77 pages.

3GPP TS 38.211 V15.1.0 (Mar. 2018), "3rd Generation Partnership Project;Technical Specification Group Radio Access Network; NR; Physical channels and modulation (Release 15)," Mar. 2018, 90 pages.

Samsung, "DMRS Scrambling for Enhanced Control Channels," 3GPP TSG RAN WG1 Meeting #69, R1-122251, Prague, Czech Republic, May 21-25, 2012, 5 pages.

Huawei, "Details of ePDCCH scrambling sequence generator initialization", 3GPP TSG RAN WG1 Meeting #69, R1-121960, Prague, Czech Republic, May 21-25, 2012, 2 pages.

Huawei, "Scrambling sequence for ePDCCH detection," 3GPP TSG RAN WG1 meeting #68bis, R1-120993, Jeju, Korea, Mar. 26-30, 2012, 4 pages.

3GPP TS 36.321 V15.1.0 (Mar. 2018), "3rd Generation Partnership Project;Technical Specification Group Radio Access Network; Evolved Universal Terrestrial Radio Access (E-UTRA); Medium Access Control (MAC) protocol specification (Release 15)," Mar. 2018, 109 pages.

3GPP TS 38.321 V15.2.0 (Jun. 2018), "3rd Generation Partnership Project; Technical Specification Group Radio Access Network; NR; Medium Access Control (MAC) protocol specification (Release 15)," Jun. 2018, 73 pages.

3GPP TS 38.331 V15.2.1 (Jun. 2018), "3rd Generation Partnership Project; Technical Specification Group Radio Access Network; NR; Radio Resource Control (RRC) protocol specification (Release 15)," Jun. 2018, 303 pages.

Office Action in Chinese Application No. 201810698574.9, dated Mar. 31, 2021, 16 pages.

PCT International Search Repost and Written Opinion in International Application No. PCT/CN2019/093637, dated Sep. 16, 2019, 18 pages.

Extended European Search Report issued in European Application No. 19826647.0 on Aug. 2, 2021, 9 pages.

Huawei, HiSilicon, "Discussion on the multi-TRP/panel transmission in NR," 3GPP TSG RAN WG1 Meeting #93, R1-1807130, Busan, Korea, May 21-25, 2018, 7 pages.

Office Action issued in Indian Application No. 202147003886 on Jan. 7, 2022, 7 pages.

Office Action in Indian Appln. No. 202147003886, mailed on May 3, 2024, 3 pages.

\* cited by examiner

Physical downlink control channel configuration information

Physical downlink control channel configuration information

Physical downlink control channel configuration information 1

Physical downlink control channel configuration information 2

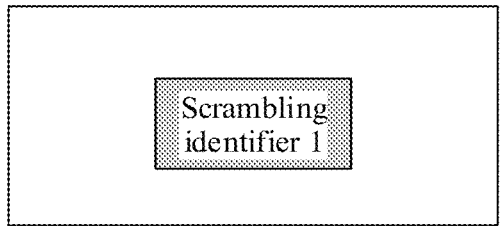
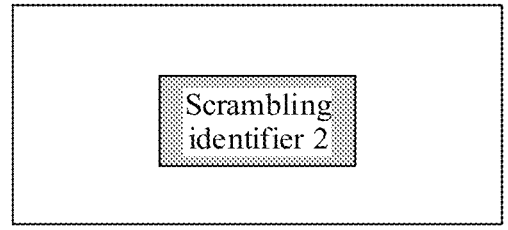

FIG. 4a

Demodulation reference signal port group parameter 1

Demodulation reference signal port group parameter 2

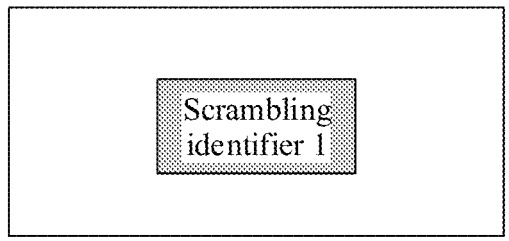
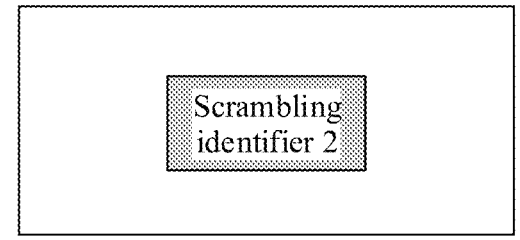

FIG. 4b

Physical downlink shared channel configuration information 1/Physical uplink shared channel configuration information 1/Physical downlink control channel configuration information 1/Scrambling identifier parameter 1

Physical downlink shared channel configuration information 2/Physical uplink shared channel configuration information 2/Physical downlink control channel configuration information 2/Scrambling identifier parameter 2

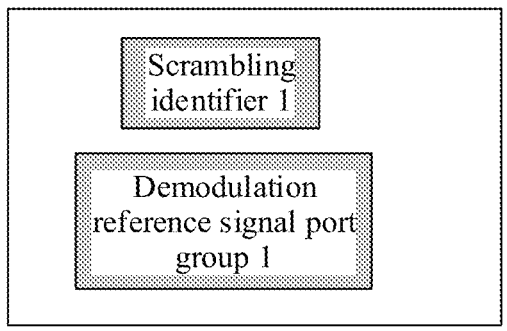
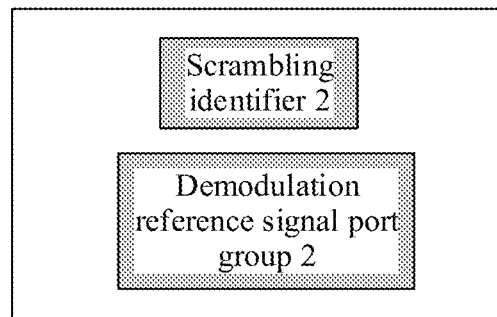

FIG. 5a

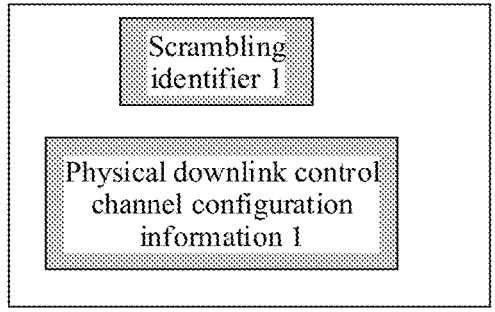
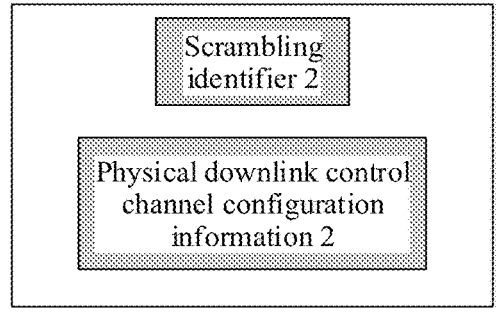
FIG. 5b
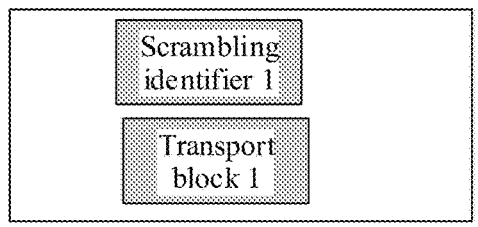
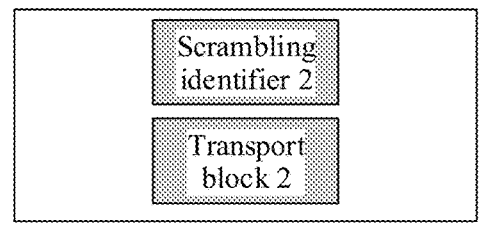
FIG. 5c
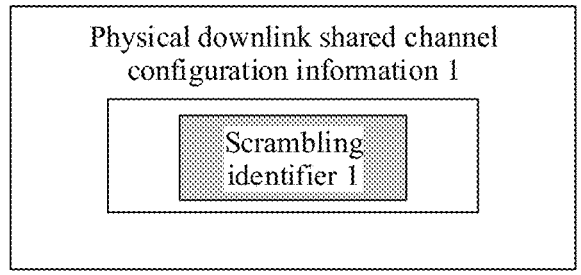
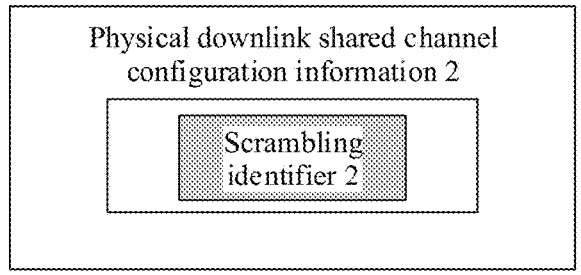
FIG. 6a

DATA SCRAMBLING METHOD AND RELATED DEVICE

CROSS-REFERENCE TO RELATED APPLICATIONS

This application is a continuation of International Application No. PCT/CN2019/093637, filed on Jun. 28, 2019, which claims priority to Chinese Patent Application No. 201810698574.9, filed on Jun. 29, 2018. The disclosures of the aforementioned applications are hereby incorporated by reference in their entireties.

TECHNICAL FIELD

This application relates to the field of communications technologies, and in particular, to a data scrambling method and a related device.

BACKGROUND

In a fifth generation (Fifth Generation, 5G) communications system, a multi-transmission reception point/multi-panel/multi-beam (Multi-TRP/panel/beam) transmission technology is a key technology for improving overall system performance and resolving an inter-cell interference problem. The multi-TRP/panel/beam transmission technology includes a plurality of solutions such as a joint transmission technology, a dynamic transmission point selection technology, a non-coherent joint transmission technology, and a coordinated scheduling/coordinated beamforming technology.

Currently, signaling is used to allocate a scrambling identifier to each piece of user equipment, that is, one piece of user equipment has only one scrambling identifier. In the multi-TRP/panel/beam transmission technology, when a plurality of transmission points/panels/beams send data to same user equipment, especially during non-coherent transmission, each transmission point uses an independent precoding scheme. In this case, all codewords are 0. When the transmission points scramble the to-be-transmitted data, scrambling code sequences used by the transmission points to scramble the data are the same because the same user equipment uses a same user equipment identity number and a same codeword, especially a configured scrambling identifier is associated with the user equipment, that is, the same user equipment has only one scrambling identifier. Consequently, interference randomization cannot be implemented on data processing of the transmission points through scrambling.

SUMMARY

This application provides a data scrambling method and a related device, to configure, for a terminal device, one scrambling identifier associated with downlink control information configuration information or a downlink control parameter, or a plurality of scrambling identifiers associated with different downlink control information configuration information or downlink control parameters.

According to a first aspect, this application provides a scrambling identifier configuration method. In the scrambling identifier configuration method, a communications device may configure one scrambling identifier associated with downlink control information configuration information or a downlink control parameter, or a plurality of scrambling identifiers associated with different downlink control information configuration information or downlink control parameters, where the downlink control information configuration information is parameter information used to obtain a downlink control channel, and the downlink control parameter is a parameter included in downlink control information or a parameter related to a parameter included in downlink control information; and the communications device may send the one scrambling identifier or the plurality of scrambling identifiers to a terminal device.

The downlink control information configuration information may be a downlink control channel configuration parameter (Physical Downlink Control Channel Config, PDCCH-Config), a control resource set (Control Resource Set, CORESET) configuration parameter, or a search space (search space) configuration parameter. The PDCCH-Config may include a CORESET and a search space, or the PDCCH-Config may include a CORESET index number and a search space index number. A parameter included in the PDCCH-Config can be used to detect a candidate downlink control channel (Physical Downlink Control Channel, PDCCH). The CORESET may be referred to as a control resource set, that is, a time-frequency resource of the CORESET, for example, a size of a resource block occupied in frequency domain or a quantity of symbols occupied in time domain. The CORESET may also be referred to as a control resource set configuration parameter, that is, a related parameter configured by using signaling, and is used to obtain a time-frequency resource of the CORESET. The search space may be referred to as a search space configuration parameter, that is, a related parameter configured by using signaling, and is used to obtain a time and a manner for searching for a candidate or possible PDCCH. Alternatively, the search space may directly refer to a location for detecting a candidate PDCCH or a location that needs to be detected.

The downlink control information configuration information may alternatively be a downlink control channel configuration parameter group (Physical Downlink Control Channel Config group, PDCCH-Config group), a control resource set configuration parameter group (CORESET group), or a search space configuration parameter group (search space group). The downlink control channel configuration parameter group may include one or more downlink control channel configuration parameters or downlink control channel configuration parameter index numbers. The control resource set configuration parameter group may include one or more control resource set configuration parameters or control resource set configuration parameter index numbers. The search space configuration parameter group may include one or more search space configuration parameters or search space configuration parameter index numbers.

The downlink control parameter may be the parameter in the downlink control information (Downlink Control Information, DCI) or the parameter related to the parameter in the downlink control information. For example, when the downlink control parameter is the parameter related to the parameter in the downlink control information, the parameter in the downlink control information may be an antenna port (antenna port) or an antenna port index number, and the parameter related to the parameter (for example, the antenna port or the antenna port index number) in the downlink control information may be a demodulation parameter signal (Demodulation Reference Signal, DMRS) port parameter. The DMRS port parameter may be a DMRS port, a DMRS port index number, a DMRS port identification code, a DMRS port group, a DMRS port group index number, or a DMRS port group identification code.

A relationship between the antenna port index number, the DMRS port, and the antenna port may be as follows: The terminal device may obtain the DMRS port based on the antenna port index number in the DCI, and then may obtain the antenna port based on the DMRS port. For example, a relationship between the DMRS port and the antenna port is: antenna port in a downlink system=1000+DMRS port; and antenna port in an uplink system=DMRS port. Regardless of the uplink system or the downlink system, the DCI indicates the antenna port or the antenna port index number. Optionally, the terminal device may further obtain the DMRS port index number, the DMRS port identification code, the DMRS port group, the DMRS port group index number, the DMRS port group identification code, or the like based on the antenna port or the antenna port index number.

For another example, when the downlink control parameter is the parameter in the downlink control information, the downlink control parameter may be a transport block (transport block, TB)-related parameter. The TB-related parameter may be a modulation and coding scheme (Modulation and coding scheme, MCS) parameter used to configure a modulation order and a bit rate, a new data indicator (New data indicator, NDI) parameter used to indicate new transmission or retransmission, a parameter used to indicate a redundancy version (Redundancy version, RV) of current transmission, or the like.

It can be learned that the scrambling identifier configured by the communications device is associated with the downlink control information configuration information or the downlink control parameter. In other words, a network device or the terminal device determines the scrambling identifier based on the downlink control information configuration information of the downlink control information or the downlink control parameter included in the downlink control information. In this case, in multi-DCI based non-coherent joint transmission, the communications device configures a plurality of scrambling identifiers for the terminal device, the terminal device uses at least two scrambling identifiers to obtain different scrambling sequences. This avoids the following problem: When only one scrambling identifier is configured for the same terminal device, obtained scrambling sequences are the same, and consequently, interference randomization cannot be implemented in non-coherent joint transmission. In other words, in this embodiment of this application, it can be ensured that the scrambling identifier configured for the terminal device is associated with the downlink control information configuration information or the downlink control parameter, so that interference randomization can be implemented in non-coherent transmission.

In an optional implementation, that the communications device sends the plurality of scrambling identifiers to the terminal device may be: The communications device sends the scrambling identifiers to the terminal device through data channel configuration information.

Different data channel configuration information carries different scrambling identifiers.

The data channel configuration information may be physical uplink shared channel configuration information (Physical Uplink Shared Channel Config, PUSCH-Config) or physical downlink shared channel configuration information (Physical Downlink Shared Channel Config, PDSCH-Config).

In another optional implementation, that the communications device sends the one scrambling identifier or the plurality of scrambling identifiers to the terminal device includes: The communications device sends the one scrambling identifier or the plurality of scrambling identifiers to the terminal device through one piece of data channel configuration information.

In still another optional implementation, when the communications device configures the one scrambling identifier associated with the downlink control information configuration information or the downlink control parameter, the network device or the terminal device may generate one or more other scrambling identifiers based on the configured scrambling identifier and with reference to a preset calculation rule.

In an optional implementation, an association relationship between the scrambling identifier and the downlink control information configuration information or the downlink control parameter is predefined, or is configured by using at least one of radio resource control RRC signaling, downlink control information DCI signaling, and MAC-CE signaling.

In an optional implementation, the association relationship between the scrambling identifier and the downlink control information configuration information or the downlink control parameter may be configured in an explicit configuration manner or an implicit configuration manner.

The explicit configuration manner means that an association relationship between each scrambling identifier and each piece of downlink control information configuration information or each downlink control parameter is configured by using the signaling or is clearly predefined.

For example, the signaling is used to configure a correspondence between each scrambling identifier or each scrambling identifier index number and each piece of downlink control information configuration information or each downlink control information configuration information index number, for example, a correspondence table; or the signaling is used to configure a correspondence between each scrambling identifier or each scrambling identifier index number and each downlink control parameter or each downlink control parameter index number, for example, a correspondence table.

For another example, the association relationship between each scrambling identifier and each piece of downlink control information configuration information or each downlink control parameter is clearly predefined as follows: Smaller downlink control information configuration information or a smaller downlink control information configuration information index number is associated with a smaller scrambling identifier or a smaller scrambling identifier index number; smaller downlink control information configuration information or a smaller downlink control information configuration information index number is associated with a larger scrambling identifier or a larger scrambling identifier index number; a smaller downlink control parameter or a smaller downlink control parameter index number is associated with a smaller scrambling identifier or a smaller scrambling identifier index number; or a smaller downlink control parameter or a smaller downlink control parameter index number is associated with a larger scrambling identifier or a larger scrambling identifier index number.

To be specific, scrambling identifiers sorted in descending order or scrambling identifier index numbers sorted in descending order correspond to downlink control information configuration information sorted in descending order or downlink control information configuration information index numbers sorted in descending order; scrambling identifiers sorted in ascending order or scrambling identifier index numbers sorted in ascending order correspond to downlink control information configuration information sorted in descending order or downlink control information configuration information index numbers sorted in descending order; scrambling identifiers sorted in descending order or scrambling identifier index numbers sorted in descending order correspond to downlink control parameters sorted in descending order or downlink control parameter index numbers sorted in descending order; or scrambling identifiers sorted in ascending order or scrambling identifier index numbers sorted in ascending order correspond to downlink control parameters sorted in descending order or downlink control parameter index numbers sorted in descending order.

For another example, when the communications device configures the one scrambling identifier, and generates the one or more other scrambling identifiers based on the configured scrambling identifier and according to the preset calculation rule, an association relationship between the configured scrambling identifier and the generated other scrambling identifiers may be determined by using the fixed rule clearly predefined in the following:

In an optional implementation, in a multi-station coordination scenario, a plurality of pieces of DCI sent by a network side may include primary DCI and secondary DCI, and the primary DCI includes more parameters or indication information than the secondary DCI. In this case, a downlink control parameter or downlink control information configuration information corresponding to the primary DCI is associated with the scrambling identifier configured by the communications device; and a downlink control parameter or downlink control information configuration information corresponding to the secondary DCI is associated with the generated scrambling identifier. When a plurality of scrambling identifiers are generated, the association relationship configured in the foregoing implicit configuration manner may be used to further determine an association relationship between each generated scrambling identifier and each downlink control parameter or each piece of downlink control information configuration information.

The primary DCI may alternatively be DCI that includes a specific parameter or some specific parameters. For example, the specific parameter may be carrier indication information (Carrier indicator), bandwidth part indication information (Bandwidth part indicator), rate matching indication information (Rate matching indicator), or zero power channel state information-reference signal trigger information (zero power channel-state information-reference signal trigger, ZP CSI-RS trigger); and correspondingly, the secondary DCI may be DCI that does not include a specific parameter or some specific parameters, for example, does not include the foregoing specific parameter.

In another optional implementation, the primary DCI may be associated with the scrambling identifier configured by the communications device, and the secondary DCI may be associated with the scrambling identifier generated by the terminal device.

In another optional implementation, larger downlink control information configuration information or a larger downlink control information configuration information index number may be associated with the scrambling identifier configured by the communications device; or a larger downlink control parameter or a larger downlink control parameter index number is associated with the scrambling identifier configured by the communications device. Smaller downlink control information configuration information or a smaller downlink control information configuration information index number may be associated with the generated scrambling identifier; or a smaller downlink control parameter or a smaller downlink control parameter index number is associated with the generated scrambling identifier.

Alternatively, conversely, smaller downlink control information configuration information or a smaller downlink control information configuration information index number may be associated with the scrambling identifier configured by the communications device; or a smaller downlink control parameter or a smaller downlink control parameter index number is associated with the scrambling identifier configured by the communications device. Larger downlink control information configuration information or a larger downlink control information configuration information index number may be associated with the generated scrambling identifier; or a larger downlink control parameter or a larger downlink control parameter index number is associated with the generated scrambling identifier.

Similarly, when a plurality of scrambling identifiers are generated, an association relationship configured in the following implicit configuration manner may be used to further determine an association relationship between each generated scrambling identifier and each downlink control parameter or each piece of downlink control information configuration information.

That the association relationship between each scrambling identifier and each piece of downlink control information configuration information or each downlink control parameter is configured in the implicit configuration manner means that no corresponding indication information is used to clearly indicate the association relationship or the association relationship is not clearly predefined, but the association relationship may be agreed on, for example, a mutual inclusion relationship is agreed on.

For example, if the downlink control information configuration information configured by using the signaling includes a scrambling identifier or a scrambling identifier index number, the scrambling identifier or a scrambling identifier corresponding to the scrambling identifier index number may be used as the scrambling identifier associated with the downlink control information configuration information. Alternatively, if the downlink control information configuration information configured by using the signaling includes both a downlink control parameter or a downlink control parameter index number and a scrambling identifier or a scrambling identifier index number, the scrambling identifier or a scrambling identifier corresponding to the scrambling identifier index number is used as the scrambling identifier associated with the downlink control parameter. Alternatively, if the downlink control parameter configured by using the signaling includes a scrambling identifier or a scrambling identifier index number, the scrambling identifier or a scrambling identifier corresponding to the scrambling identifier index number is used as the scrambling identifier associated with the downlink control parameter. Alternatively, if a scrambling identifier parameter configured by using the signaling includes both a downlink control parameter or a downlink control parameter index number and a scrambling identifier or a scrambling identifier index number, the scrambling identifier included in the scrambling identifier parameter or a scrambling identifier corresponding to the scrambling identifier index number included in the scrambling identifier parameter is used as the scrambling identifier associated with the downlink control parameter.

In another optional implementation, the data channel configuration information carrying the scrambling identifier is associated with the downlink control information configuration information or the downlink control parameter.

An association relationship between the data channel configuration information and the downlink control information configuration information or the downlink control parameter is predefined, or is configured by using at least one of radio resource control (Radio resource control, RRC) signaling, downlink control information (Downlink control information, DCI) signaling, and media access control control element (Media Access Control control element, MAC-CE) signaling.

Similarly, the association relationship between the data channel configuration information and the downlink control information configuration information or the downlink control parameter may be configured in an explicit configuration manner or an implicit configuration manner.

The explicit configuration manner means that corresponding indication information is used to indicate the association relationship, or the association relationship is predefined.

For example, in the explicit configuration manner, the signaling is used to configure a correspondence between each piece of data channel configuration information or each data channel configuration information index number and each piece of downlink control information configuration information or each downlink control information configuration information index number, for example, a correspondence table; or the signaling is used to configure a correspondence between each piece of data channel configuration information or each data channel configuration information index number and each downlink control parameter or each downlink control parameter index number, for example, a correspondence table.

For another example, the association relationship between each piece of data channel configuration information and each piece of downlink control information configuration information or each downlink control parameter is clearly predefined as follows: Larger data channel configuration information or a larger data channel configuration information index number corresponds to larger downlink control information configuration information or a larger downlink control information configuration information index number; smaller data channel configuration information or a smaller data channel configuration information index number corresponds to larger downlink control information configuration information or a larger downlink control information configuration information index number; larger data channel configuration information or a larger data channel configuration information index number corresponds to a larger downlink control parameter or a larger downlink control parameter index number; or smaller data channel configuration information or a smaller data channel configuration information index number corresponds to a larger downlink control parameter or a larger downlink control parameter index number.

To be specific, data channel configuration information sorted in descending order or data channel configuration information index numbers sorted in descending order correspond to downlink control information configuration information sorted in descending order or downlink control information configuration information index numbers sorted in descending order; data channel configuration information sorted in ascending order or data channel configuration information index numbers sorted in ascending order correspond to downlink control information configuration information sorted in descending order or downlink control information configuration information index numbers sorted in descending order; data channel configuration information sorted in descending order or data channel configuration information index numbers sorted in descending order correspond to downlink control parameters sorted in descending order or downlink control parameter index numbers sorted in descending order; or data channel configuration information sorted in ascending order or data channel configuration information index numbers sorted in ascending order correspond to downlink control parameters sorted in descending order or downlink control parameter index numbers sorted in descending order.

The implicit configuration manner means that no corresponding indication information is used to clearly indicate the association relationship or the association relationship is not clearly predefined, but the association relationship may be agreed on, for example, a mutual inclusion relationship is agreed on. For example, if the downlink control information configuration information configured by using the signaling includes data channel configuration information or a data channel configuration information index number, the data channel configuration information or data channel configuration information corresponding to the index number is associated with the downlink control information configuration information; or if a structure or configuration information configured by using the signaling includes both data channel configuration information or a data channel configuration information index number and a downlink control parameter or a downlink control parameter index number, the data channel configuration information or data channel configuration information corresponding to the data channel configuration information index number is associated with the downlink control parameter or a downlink control parameter corresponding to the downlink control parameter index number.

According to a second aspect, this application further provides a data scrambling method. The data scrambling method is described on a network device side. The data scrambling method may include: A network device determines downlink control information configuration information or a downlink control parameter; the network device determines a scrambling identifier associated with the downlink control information configuration information or the downlink control parameter; and the network device scrambles or descrambles data by using the scrambling identifier, where the data is data corresponding to downlink control information; the downlink control information is downlink control information carried on a downlink control channel that is obtained based on the downlink control information configuration information, is downlink control information including the downlink control parameter, or is downlink control information including a parameter related to the downlink control parameter; the downlink control parameter is a parameter included in the downlink control information or a parameter related to a parameter included in the downlink control information; and the downlink control information configuration information is parameter information used to obtain the downlink control channel.

Different scrambling identifiers are associated with different downlink control information configuration information or different downlink control parameters.

In an optional implementation, the scrambling identifier associated with the downlink control information configuration information is a scrambling identifier included in the downlink control information configuration information, or is a scrambling identifier corresponding to a scrambling identifier index number included in the downlink control information configuration information; the scrambling identifier associated with the downlink control parameter is a scrambling identifier included in the downlink control information that includes the downlink control parameter, or is a scrambling identifier corresponding to a scrambling identifier index number included in the downlink control information that includes the downlink control parameter; the scrambling identifier associated with the downlink control parameter is a scrambling identifier included in the downlink control parameter, or is a scrambling identifier corresponding to a scrambling identifier index number included in the downlink control parameter; or the scrambling identifier associated with the downlink control parameter is a scrambling identifier included in a scrambling identifier parameter that includes the downlink control parameter, or is a scrambling identifier corresponding to a scrambling identifier index number included in a scrambling identifier parameter that includes the downlink control parameter.

In another optional implementation, the scrambling identifier associated with the downlink control information configuration information is a scrambling identifier included in data channel configuration information associated with the downlink control information configuration information, or is a scrambling identifier corresponding to a scrambling identifier index number included in data channel configuration information associated with the downlink control information configuration information; or the scrambling identifier associated with the downlink control parameter is a scrambling identifier included in data channel configuration information associated with the downlink control parameter, or is a scrambling identifier corresponding to a scrambling identifier index number included in data channel configuration information associated with the downlink control parameter.

It can be learned that, in this embodiment of this application, when the network device scrambles or descramble the data, different scrambling identifiers are associated with different downlink control information configuration information or different downlink control parameters, so that different scrambling sequences can be used for the corresponding data. This can ensure interference randomization in non-coherent joint transmission.

According to a third aspect, this application further provides a data scrambling method. The data scrambling method is described on a terminal device side. The data scrambling method includes: A terminal device determines one scrambling identifier that is configured by a communications device and that is associated with downlink control information configuration information or a downlink control parameter, or a plurality of scrambling identifiers that are configured by a communications device and that are associated with different downlink control information configuration information or downlink control parameters; and the terminal device scrambles or descrambles data by using the scrambling identifier associated with the downlink control information configuration information or the downlink control parameter, where the data is data scheduled by using downlink control information; the downlink control information is downlink control information carried on a downlink control channel that is obtained based on the downlink control information configuration information, is downlink control information including the downlink control parameter, or is downlink control information including a parameter related to the downlink control parameter; the downlink control information configuration information is parameter information used to obtain the downlink control channel; and the downlink control parameter is a parameter included in the downlink control information or a parameter related to a parameter included in the downlink control information.

It can be learned that in this embodiment of this application, the scrambling identifier is associated with the downlink control information configuration information or the downlink control parameter. In this way, the terminal device can identify the corresponding scrambling identifier based on the downlink control information configuration information or the downlink control parameter. For example, in multi-DCI based non-coherent joint transmission, each network device may transmit data by using different scrambling identifiers corresponding to different downlink control information configuration information or downlink control parameters, and the terminal device can identify a scrambling identifier corresponding to each piece of downlink control information configuration information or each downlink control parameter. Therefore, different scrambling sequences may be obtained by using at least two scrambling identifiers. This avoids the following problem: When only one scrambling identifier is configured for the terminal device, obtained scrambling sequences are the same, and consequently, interference randomization cannot be implemented in non-coherent joint transmission.

In an optional implementation, that the terminal device determines the plurality of scrambling identifiers that are configured by the communications device and that are associated with the different downlink control information configuration information or downlink control parameters includes: After receiving a plurality of pieces of data channel configuration information sent by the communications device, the terminal device determines, from the plurality of pieces of data channel configuration information, the plurality of scrambling identifiers associated with the different downlink control information configuration information or downlink control parameters, where each piece of data channel configuration information includes one scrambling identifier.

Different data channel configuration information carries different scrambling identifiers.

In another optional implementation, that the terminal device determines the one scrambling identifier that is configured by the communications device and that is associated with the downlink control information configuration information or the downlink control parameter, or the plurality of scrambling identifiers that are configured by the communications device and that are associated with the different downlink control information configuration information or downlink control parameters includes: After receiving one piece of data channel configuration information sent by the communications device, the terminal device determines, from the piece of data channel configuration information, the one scrambling identifier associated with the downlink control information configuration information or the downlink control parameter, or the plurality of configured scrambling identifiers associated with the different downlink control information configuration information or downlink control parameters.

In still another optional implementation, when the terminal device determines the one scrambling identifier configured by the communications device, the method further includes: The terminal device generates one or more other scrambling identifiers based on the configured scrambling identifier and according to a preset calculation rule. In this way, compared with the foregoing implementation, this implementation can reduce signaling overheads.

Correspondingly, each piece of data channel configuration information carrying the scrambling identifier is associated with each piece of downlink control information configuration information or each downlink control parameter; and an association relationship between each piece of data channel configuration information and each piece of downlink control information configuration information or each downlink control parameter is predefined, or is configured by using at least one of radio resource control RRC signaling, downlink control information DCI signaling, and MAC-CE signaling.

For the predefined association relationship between each piece of data channel configuration information and each piece of downlink control information configuration information or each downlink control parameter, or the association relationship that is between each piece of data channel configuration information and each piece of downlink control information configuration information or each downlink control parameter and that is configured by using the signaling such as the RRC signaling, the DCI signaling, or the MAC-CE signaling, refer to the implicit configuration manner and the explicit configuration manner in the first aspect. Details are not described herein again.

In an optional implementation, an association relationship between the scrambling identifier and the downlink control information configuration information or the downlink control parameter is predefined, or is configured by using at least one of radio resource control RRC signaling, downlink control information DCI signaling, and MAC-CE signaling.

For the predefined association relationship between the scrambling identifier and the downlink control information configuration information or the downlink control parameter, or the association relationship that is between the scrambling identifier and the downlink control information configuration information or the downlink control parameter and that is configured by using the signaling (for example, at least one of the RRC signaling, the DCI signaling, and the MAC-CE signaling), refer to content related to the explicit configuration manner in the first aspect. Details are not described herein again.

Correspondingly, for the association relationship that is between the scrambling identifier and the downlink control information configuration information or the downlink control parameter and that is configured in the implicit configuration manner, refer to content related to the implicit configuration manner in the first aspect. Details are not described herein again.

In another optional implementation, the data channel configuration information carrying the scrambling identifier is associated with the downlink control information configuration information or the downlink control parameter; and an association relationship between the data channel configuration information and the downlink control information configuration information or the downlink control parameter is predefined, or is configured by using at least one of radio resource control RRC signaling, downlink control information DCI signaling, and media access control control element MAC-CE signaling.

For the predefined association relationship between the data channel configuration information and the downlink control information configuration information or the downlink control parameter, or the association relationship that is between the data channel configuration information and the downlink control information configuration information or the downlink control parameter and that is configured by using the signaling (for example, at least one of the RRC signaling, the DCI signaling, and the MAC-CE signaling), refer to content related to the explicit configuration manner in the first aspect. Details are not described herein again.

Correspondingly, for the association relationship that is between the data channel configuration information and the downlink control information configuration information or the downlink control parameter and that is configured in the implicit configuration manner, refer to content related to the implicit configuration manner in the first aspect. Details are not described herein again.

In this embodiment of this application, that the terminal device scrambles or descrambles the data by using the scrambling identifier associated with the downlink control information configuration information or the downlink control parameter includes: The terminal device determines the downlink control information configuration information or the downlink control parameter; the terminal device determines the scrambling identifier associated with the downlink control information configuration information or the scrambling identifier associated with the downlink control parameter; and the terminal device scrambles or descrambles the data by using the scrambling identifier.

In an optional implementation, the scrambling identifier associated with the downlink control information configuration information is a scrambling identifier included in data channel configuration information associated with the downlink control information configuration information, or is a scrambling identifier corresponding to a scrambling identifier index number included in data channel configuration information associated with the downlink control information configuration information; or the scrambling identifier associated with the downlink control parameter is a scrambling identifier included in data channel configuration information associated with the downlink control parameter, or is a scrambling identifier corresponding to a scrambling identifier index number included in data channel configuration information associated with the downlink control parameter.

In another optional implementation, the scrambling identifier associated with the downlink control information configuration information is a scrambling identifier included in the downlink control information configuration information, or is a scrambling identifier corresponding to a scrambling identifier index number included in the downlink control information configuration information;

the scrambling identifier associated with the downlink control parameter is a scrambling identifier included in the downlink control information that includes the downlink control parameter, or is a scrambling identifier corresponding to a scrambling identifier index number included in the downlink control information that includes the downlink control parameter;

the scrambling identifier associated with the downlink control parameter is a scrambling identifier included in the downlink control parameter, or is a scrambling identifier corresponding to a scrambling identifier index number included in the downlink control parameter; or the scrambling identifier associated with the downlink control parameter is a scrambling identifier included in a scrambling identifier parameter that includes the downlink control parameter, or is a scrambling identifier corresponding to a scrambling identifier index number included in a scrambling identifier parameter that includes the downlink control parameter.

In still another optional implementation, the scrambling identifier associated with the downlink control information configuration information may be obtained based on the correspondence that is between the downlink control information configuration information and the scrambling identifier and that is configured by using the signaling or is predefined, or is obtained based on the correspondence that is between the downlink control information configuration information and the data channel configuration information and that is configured by using the signaling or is predefined. Alternatively, the scrambling identifier associated with the downlink control parameter may be obtained based on the correspondence that is between the downlink control parameter and the scrambling identifier and that is configured by using the signaling or is predefined, or is obtained based on the correspondence that is between the downlink control parameter and the data channel configuration information and that is configured by using the signaling or is predefined.

In addition, in this embodiment of this application, when the terminal device has different capabilities, scrambling identifiers configured by the communications device for the terminal device may also be different. The capability of the terminal device is whether the terminal device supports multi-DCI based non-coherent transmission, whether the terminal device supports receiving of two pieces of DCI in a same time unit (for example, one slot), or whether the terminal device supports being configured with a plurality of scrambling identifiers, a plurality of pieces of data channel configuration information, a plurality of pieces of downlink control information configuration information, or the like.

In an optional implementation, if the terminal device does not support multi-DCI based non-coherent transmission, the terminal device does not expect to be configured with the plurality of scrambling identifiers. In this case, the communications device can configure only one scrambling identifier for the terminal device, and the terminal device does not expect the scrambling identifier to be associated with the downlink control information configuration information or the downlink control parameter. In another optional implementation, if the terminal device does not support multi-DCI based non-coherent transmission, the terminal device does not expect to be configured with the plurality of scrambling identifiers, and does not expect the association relationship between the one configured scrambling identifier and the downlink control information configuration information or the downlink control parameter. In this case, the communications device may configure the one scrambling identifier for the terminal device, and the scrambling identifier has no association relationship with another configuration parameter.

In still another optional implementation, it is assumed that the terminal device does not support multi-DCI based non-coherent transmission, but no limitation is imposed on the communications device. In other words, the communications device may still configure, for the terminal device by using the foregoing optional implementations, the plurality of scrambling identifiers and the association relationship between each scrambling identifier and each piece of downlink control information configuration information or each downlink control parameter. Correspondingly, the terminal device may select one scrambling identifier from the plurality of scrambling identifiers according to a preset rule. For example, the preset rule is that the terminal device selects a scrambling identifier associated with smaller downlink control information configuration information or a smaller downlink control information configuration information index number; the terminal device selects a scrambling identifier associated with a smaller downlink control parameter or a smaller downlink control parameter index number; or when the communications device configures the one scrambling identifier and other scrambling identifiers are generated based on the configured scrambling identifier and according to the preset calculation rule, the terminal device selects the configured scrambling identifier or selects a generated scrambling identifier.

In still another optional implementation, it is assumed that the terminal device does not support multi-DCI based non-coherent transmission, but no limitation is imposed on the communications device. In other words, the communications device may still configure, for the terminal device by using the foregoing optional implementations, the plurality of scrambling identifiers and the association relationship between each scrambling identifier and each piece of downlink control information configuration information or each downlink control parameter. Correspondingly, the terminal device may still determine the scrambling identifier based on the association relationship.

In an optional implementation, the terminal device supports multi-DCI based non-coherent transmission. When the communications device configures only one scrambling identifier, the terminal device does not expect the association relationship between the scrambling identifier and the downlink control information configuration information or the downlink control parameter. In this case, the terminal device directly performs scrambling or descrambling by using the configured scrambling identifier. Alternatively, in this case, the terminal device does not limit the association relationship, and the terminal device may still perform scrambling or descrambling by using the association relationship and the scrambling identifier.

In another optional implementation, the terminal device supports multi-DCI based non-coherent transmission, and the communications device configures the plurality of scrambling identifiers for the terminal device.

Assuming that the terminal device is notified that the terminal device is in a multi-DCI based non-coherent transmission scenario, the terminal device or the communications device selects the scrambling identifiers based on the association relationship and according to the foregoing embodiments.

Assuming that the terminal device is notified that the terminal device is not in a multi-DCI based non-coherent transmission scenario, that is, the terminal device needs only one scrambling identifier, in an implementation, the terminal device may select the one scrambling identifier according to a preset rule. For example, the preset rule is that the terminal device selects a scrambling identifier associated with smaller downlink control information configuration information or a smaller downlink control information configuration information index number; the terminal device selects a scrambling identifier associated with a smaller downlink control parameter or a smaller downlink control parameter index number; or when the communications device configures the one scrambling identifier and other scrambling identifiers are generated based on the configured scrambling identifier and according to the preset calculation rule, the terminal device selects the configured scrambling identifier or selects a generated scrambling identifier. In another implementation, the terminal device may still determine the one scrambling identifier based on the association relationship.

In an optional embodiment, if the terminal device is notified that the terminal device is not in the multi-DCI based non-coherent transmission scenario, the terminal device does not expect to be configured with the plurality of scrambling identifiers. In other words, only one scrambling identifier can be configured for the terminal device. In this case, if the terminal device does not expect to be configured with the association relationship between the scrambling identifier and the downlink control information configuration information or the downlink control parameter, the communications device needs to configure only one scrambling identifier for the terminal device, and the terminal device performs scrambling or descrambling by using the scrambling identifier. If the terminal device does not expect to be configured with the plurality of scrambling identifiers only, and the association relationship is not limited, the association relationship may still be retained for the scrambling identifier configured by the communications device for the terminal device.

If the terminal device is notified that the terminal device is not in the multi-DCI based non-coherent transmission scenario, it indicates that the terminal device is definitely not in the scenario in this case. If the terminal device is notified that the terminal device is in the multi-DCI based non-coherent transmission scenario, it indicates that the terminal device may be in the scenario, or may not be in the scenario, but it does not indicate that the terminal device is in the scenario all the time.

The foregoing optional implementations described based on the capability of the terminal device are used to indicate that determining of the scrambling identifier correspondingly changes based on different capabilities of the terminal device or different scenarios in which the terminal device is currently located. This helps ensure integrity of the solutions during implementation of this application.

It should be understood that the communications device, the network device, and the terminal device described in the first aspect to the third aspect of this application may be located in a same communications system, and the one scrambling identifier configured by the communications device is associated with the downlink control information configuration information or the downlink control parameter, or the plurality of scrambling identifiers configured by the communications device are associated with the different downlink control information configuration information or downlink control parameters. Values of the scrambling identifiers associated with the different downlink control information configuration information or downlink control parameters may be the same. For example, when a plurality of transmission reception points send same data to a same terminal device, because the same data can improve robustness, a problem of interference randomization does not need to be considered. In this case, values of scrambling identifiers used by the plurality of transmission reception points may be the same. In addition, values of the scrambling identifiers associated with the different downlink control information configuration information or downlink control parameters may be different. For example, when a plurality of transmission reception points send different data to a same terminal device, the problem of interference randomization needs to be considered. In this case, values of scrambling identifiers used by the plurality of transmission reception points may be different. In conclusion, in the solutions described in the embodiments of this application, the one scrambling identifier or the plurality of scrambling identifiers may be configured with reference to the capability of the terminal device and a communication scenario, and the association relationship for the scrambling identifier does not need to be changed. In other words, a configuration architecture of the entire communications system remains unchanged. Therefore, the communications system can be smoothly transited to the application scenario of the plurality of scrambling identifiers, to resolve the problem of interference randomization in the non-coherent joint transmission scenario.

According to a fourth aspect, this application further provides a communications device. The communications device has some or all functions of implementing the communications device in the foregoing method examples. For example, the communications device may have functions in some or all embodiments of this application, or may have a function of independently implementing any embodiment of this application. The function may be implemented by hardware, or implemented by hardware executing corresponding software. The hardware or the software includes one or more units or modules corresponding to the foregoing function.

In a possible design, a structure of the communications device may include a configuration unit and a sending unit. The configuration unit is configured to support the communications device in performing a corresponding function in the foregoing methods. The sending unit is configured to support communication between the communications device and another device. The communications device may further include a storage unit. The storage unit is configured to couple to the configuration unit and the sending unit, and the storage unit stores a program instruction and data that are necessary for the communications device. For example, the configuration unit may be a processor, the sending unit may be a transceiver, and the storage unit may be a memory.

According to a fifth aspect, this application further provides a network device. The network device has some or all functions of implementing the network device in the foregoing method examples. For example, the network device may have functions in some or all embodiments of this application, or may have a function of independently implementing any embodiment of this application. The function may be implemented by hardware, or implemented by hardware executing corresponding software. The hardware or the software includes one or more units or modules corresponding to the foregoing function.

In a possible design, a structure of the network device may include a determining unit and a processing unit. The determining unit and the processing unit are configured to support the network device in performing a corresponding function in the foregoing methods. The network device may further include a communications unit, configured to support communication between the network device and another device. For example, the communications unit is configured to send scrambled data or receive to-be-descrambled data. The network device may further include a storage unit. The storage unit is configured to couple to the determining unit and the processing unit, and the storage unit stores a program instruction and data that are necessary for the network device. For example, the processing unit and the determining unit may be a processor, the communications unit may be a transceiver, and the storage unit may be a memory.

According to another aspect, an embodiment of the present invention provides a terminal device. The terminal device has some or all functions of implementing the terminal device in the foregoing method examples. For example, the terminal device may have functions in some or all embodiments of this application, or may have a function of independently implementing any embodiment of this application. The function may be implemented by hardware, or implemented by hardware executing corresponding software. The hardware or the software includes one or more units or modules corresponding to the foregoing function.

In a possible design, a structure of the terminal device includes a processing unit and a determining unit. The determining unit and the processing unit are configured to support the terminal device in performing a corresponding function in the foregoing methods. The terminal device may further include a communications unit, configured to support communication between the terminal device and another device. The terminal device may further include a storage unit. The storage unit is configured to couple to the processing unit, the determining unit, and the communications unit, and the storage unit stores a program instruction and data that are necessary for the terminal device. For example, the determining unit and the processing unit may be a processor, the communications unit may be a transceiver, and the storage unit may be a memory.

According to another aspect, an embodiment of the present invention provides a communications system. The system includes at least one communications device, at least one network device, and at least one terminal device in the foregoing aspects. In another possible design, the system may further include another device that interacts with the terminal device, the network device, or the communications device in the solutions provided in the embodiments of the present invention.

According to another aspect, an embodiment of the present invention provides a computer storage medium, configured to store a computer software instruction used by the foregoing network device. The computer software instruction includes a program designed for performing the method according to any one of the foregoing aspects.

According to another aspect, an embodiment of the present invention provides a computer storage medium, configured to store a computer software instruction used by the foregoing terminal device. The computer software instruction includes a program designed for performing the method according to any one of the foregoing aspects.

According to another aspect, this application further provides a computer program product including an instruction. When the computer program product runs on a computer, the computer is enabled to perform the methods described in the foregoing aspects.

According to another aspect, this application provides a chip system. The chip system includes a processor, configured to support a communications device or a network device in implementing a function in the foregoing aspects, for example, determining or processing data and/or information in the foregoing methods. In a possible design, the chip system further includes a memory, and the memory is configured to store a program instruction and data that are necessary for communications device or the network device. The chip system may include a chip, or may include a chip and another discrete component.

According to another aspect, this application provides a chip system. The chip system includes a processor, configured to support a terminal device in implementing a function in the foregoing aspects, for example, generating or processing data and/or information in the foregoing methods. In a possible design, the chip system further includes a memory, and the memory is configured to store a program instruction and data that are necessary for the terminal device. The chip system may include a chip, or may include a chip and another discrete component.

BRIEF DESCRIPTION OF DRAWINGS

FIG. 4a and FIG. 4b each are a schematic diagram of still another scrambling identifier configuration manner according to an embodiment of this application;

FIG. 5a to FIG. 5c each are a schematic diagram of still another scrambling identifier configuration manner according to an embodiment of this application;

FIG. 6a to FIG. 6d each are a schematic diagram of still another scrambling identifier configuration manner according to an embodiment of this application;

DESCRIPTION OF EMBODIMENTS

Figure 1:
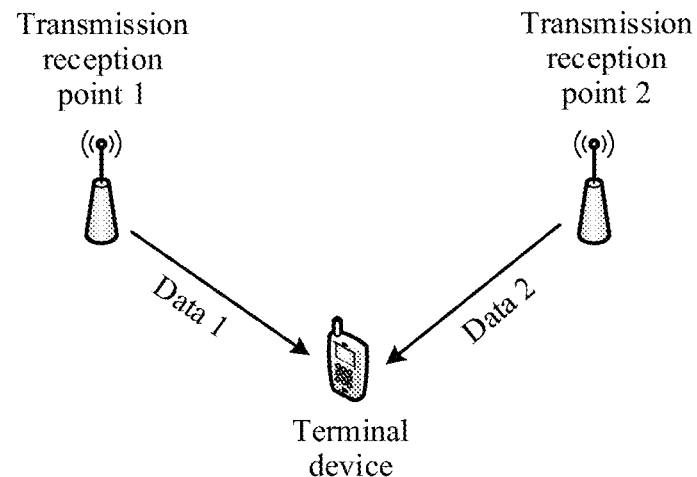
FIG. 1 is a schematic diagram of a multi-transmission reception point coordinated transmission according to an embodiment of this application.

Embodiments of this application provide a scrambling identifier configuration method, a data scrambling method, and a related device, to resolve the following problem: When a network device can configure only one scrambling identifier for a terminal device, only same scrambling sequences can be used, and consequently, interference randomization cannot be implemented in non-coherent joint transmission.

Technical solutions in this application may be specifically applied to various communications systems, for example, a global system for mobile communications (Global system for mobile communications, GSM for short), a code division multiple access (Code Division Multiple Access, CDMA for short) system, a wideband code division multiple access (Wideband Code Division Multiple Access, WCDMA for short) system, a time division-synchronous code division multiple access (Time Division-Synchronous Code Division Multiple Access, TD-SCDMA for short) system, a universal mobile telecommunications system (Universal Mobile Telecommunications System, UMTS for short) system, and a long term evolution (Long Term Evolution, LTE for short) system. With continuous development of communications technologies, the technical solutions in this application may be further applied to, for example, a 5G system which may also be referred to as a new radio (New Radio, NR for short) system, or the technical solutions may be applied to a device to device (device to device, D2D for short) system, a machine to machine (machine to machine, M2M for short) system, or the like.

A network device in this application may be an entity used to send or receive information at a network side, and may be, for example, a base station, a transmission point (transmission point, TP for short), a transmission reception point (transmission reception point, TRP for short), a relay device, or another network device that has a base station function. This is not limited in this application. A communications device in this application may be a centralized control module or another network device. The communications device can configure, for a terminal device, one scrambling identifier associated with downlink control information configuration information or a downlink control parameter, or a plurality of scrambling identifiers associated with different downlink control information configuration information or downlink control parameters. In this application, the communications device and the network device may be a same device, or may be different devices.

In this application, the terminal device is a device having a communication function, and may be, for example, a handheld device having a wireless communication function, a vehicle-mounted device, a wearable device, a computing device, or another processing device connected to a wireless modem. The terminal device may have different names in different networks, for example, a terminal (terminal), user equipment (user equipment, UE for short), a mobile station, a subscriber unit, a relay (Relay), a station, a cellular phone, a personal digital assistant, a wireless modem, a wireless communications device, a handheld device, a laptop computer, a cordless phone, and a wireless local loop station. The terminal device may be a wireless terminal or a wired terminal. The wireless terminal may be a device that provides a user with voice and/or data connectivity, the handheld device having a wireless connection function, or the another processing device connected to the wireless modem. The wireless terminal may communicate with one or more core networks through a radio access network (RAN, radio access network).

For example, FIG. 1 is a schematic diagram of multi-transmission reception point coordinated transmission according to an embodiment of this application. In FIG. 1, for example, network devices TRP 1 and TRP 2 separately transmit data to a terminal device.

In a fifth generation communications system, an initial state of a scrambling sequence used for data scrambling is:

$$c_{init} = n_{RNTI} \cdot 2^{15} + q \cdot 2^{14} = + n_{ID}$$

$n_{RNTI}$ is a radio network temporary identifier used during PDSCH/PUSCH transmission; q is a codeword (when a single codeword is used, q=0; or when a multiplexing mode is used, a codeword q corresponding to one transport block is 0, and a codeword q corresponding to the other transport block is 1); and $n_{ID}$ is a unique scrambling identifier (which may also be referred to as a scrambling ID) configured for the terminal device by using signaling.

It can be learned that, in non-coherent joint transmission, assuming that the two network devices TRP 1 and TRP 2 transmit the data to the terminal device and each TRP sends a single codeword to the UE, the codeword q of each TRP is 0. The terminal device uses a same radio network temporary identifier and a same scrambling identifier. Consequently, scrambling sequences obtained by the two TRPs based on the foregoing formula are the same, and interference randomization cannot be implemented.

To resolve this problem, the communications device may configure one scrambling identifier associated with downlink control information configuration information or a downlink control parameter, or a plurality of scrambling identifiers associated with different downlink control information configuration information or downlink control parameters, where the downlink control information configuration information is parameter information used to obtain a downlink control channel, and the downlink control parameter is a parameter included in downlink control information or a parameter related to a parameter included in downlink control information; and the communications device sends the one scrambling identifier or the plurality of scrambling identifiers to the terminal device.

Because of the foregoing configuration content, the network device may determine the downlink control information configuration information or the downlink control parameter; and then determine the scrambling identifier associated with the downlink control information configuration information or the downlink control parameter; and the network device scrambles or descrambles data by using the scrambling identifier. Correspondingly, the terminal device determines the one scrambling identifier that is configured by the communications device and that is associated with the downlink control information configuration information or the downlink control parameter, or the plurality of scrambling identifiers that are configured by the communications device and that are associated with the different downlink control information configuration information or downlink control parameters; and the terminal device may scramble or descramble the data by using the scrambling identifier associated with the downlink control information configuration information or the downlink control parameter. Different downlink control information configuration information or different downlink control parameters may be associated with different scrambling identifiers; the data is data corresponding to the downlink control information; and the downlink control information is downlink control information carried on the downlink control channel that is obtained based on the downlink control information configuration information, is downlink control information including the downlink control parameter, or is downlink control information including a parameter related to the downlink control parameter.

To be specific, when the method is applied to a multi-DCI scenario, the terminal device can identify a scrambling identifier associated with downlink control information configuration information or a downlink control parameter corresponding to each piece of DCI, to scramble or descramble the data. This avoids a prior-art problem caused when only one scrambling identifier can be configured for the terminal device, for example, a problem that interference randomization cannot be implemented in non-coherent joint transmission.

In the embodiments of this application, the downlink control information configuration information is the parameter information used to obtain the downlink control channel, and the network device side may send a plurality of pieces of downlink control information configuration information to the terminal through signaling. The downlink control information configuration information may also be referred to as a downlink control information configuration field, a downlink control information information element (information element, IE), or the like.

The downlink control information configuration information may be a downlink control channel configuration parameter (Physical Downlink Control Channel Config, PDCCH-Config), a control resource set (Control Resource Set, CORESET) configuration parameter, or a search space (search space) configuration parameter. The PDCCH-Config may include a control resource set and a search space, and a parameter included in the PDCCH-Config is used to detect a candidate downlink control channel (Physical Downlink Control Channel, PDCCH). The CORESET may be referred to as a control resource set, that is, a time-frequency resource of the CORESET, for example, a size of a resource block occupied in frequency domain or a quantity of symbols occupied in time domain. The CORESET may also be referred to as a control resource set configuration parameter, that is, a related parameter configured by using signaling, and is used to obtain a time-frequency resource of the CORESET. The search space may be referred to as a search space configuration parameter, that is, a related parameter configured by using signaling, and is used to obtain a time and a manner for searching for a candidate or possible PDCCH. Alternatively, the search space may directly refer to a location for detecting a candidate PDCCH or a location that needs to be detected.

The downlink control information configuration information may alternatively be a downlink control channel configuration parameter group (Physical Downlink Control Channel Config group, PDCCH-Config group), a control resource set configuration parameter group (CORESET group), or a search space configuration parameter group (search space group). The downlink control channel configuration parameter group may include one or more downlink control channel configuration parameters or downlink control channel configuration parameter index numbers. The control resource set configuration parameter group may include one or more control resource set configuration parameters or control resource set configuration parameter index numbers. The search space configuration parameter group may include one or more search space configuration parameters or search space configuration parameter index numbers.

In the embodiments of this application, the downlink control parameter is the parameter included in the downlink control information or the parameter related to the parameter included in the downlink control information. For example, when the downlink control parameter is the parameter related to the parameter in the downlink control information, the parameter in the downlink control information may be an antenna port (antenna port) or an antenna port index number, and the parameter related to the parameter (for example, the antenna port antenna port or the antenna port index number) in the downlink control information may be a demodulation parameter signal (Demodulation Reference Signal, DMRS) port parameter. The DMRS port parameter may be a DMRS port, a DMRS port group, a DMRS port index number, a DMRS port identification code, a DMRS port group index number, or a DMRS port group identification code.

A relationship between the antenna port index number, the DMRS port, and the antenna port may be as follows: The terminal device may obtain the DMRS port based on the antenna port index number, and then may obtain the antenna port based on the DMRS port. For example, antenna port in a downlink system=1000+DMRS port; and antenna port in an uplink system=DMRS port. Regardless of the uplink system or the downlink system, the DCI indicates the antenna port or the antenna port index number. Optionally, the terminal device may further obtain the DMRS port index number, the DMRS port identification code, a DMRS port group, the DMRS port group index number, the DMRS port group identification code, or the like based on the antenna port or the antenna port index number.

If an association relationship between the DMRS port and the scrambling identifier is configured by using signaling, the network device or the terminal device may obtain the DMRS port based on the antenna port or the antenna port index number in the determined DCI; and the terminal device or the network device scrambles or descrambles, by using the scrambling identifier associated with the DMRS port, the data corresponding to the determined DCI. If an association relationship between the DMRS port group and the scrambling identifier is configured by using signaling, after deriving the DMRS port based on the antenna port or the antenna port index number, the network device or the terminal device further needs to determine the DMRS port group to which the DMRS port belongs, and selects the scrambling identifier associated with the DMRS port group to scramble or descramble the data.

For another example, when the downlink control parameter is the parameter in the downlink control information, the downlink control parameter may be a transport block (transport block, TB) related parameter. The TB-related parameter may be a modulation and coding scheme (Modulation and coding scheme, MCS) parameter used to configure a modulation order and a bit rate, a new data indicator (New data indicator, NDI) parameter used to indicate new transmission or retransmission, a parameter used to indicate a redundancy version (Redundancy version, RV) of current transmission, or the like.

In an optional implementation, that the communications device sends the plurality of scrambling identifiers to the terminal device may be: The communications device sends the scrambling identifiers to the terminal device through data channel configuration information. Different data channel configuration information carries different scrambling identifiers.

The data channel configuration information may be physical uplink shared channel configuration information (Physical Uplink Shared Channel Config, PUSCH-Config) or physical downlink shared channel configuration information (Physical Downlink Shared Channel Config, PDSCH-Config).

In another optional implementation, that the communications device sends the one scrambling identifier or the plurality of scrambling identifiers to the terminal device includes: The communications device sends the one scrambling identifier or the plurality of scrambling identifiers to the terminal device through one piece of data channel configuration information.

In still another optional implementation, the communications device configures the one scrambling identifier, and the network device or the terminal device may generate one or more other scrambling identifiers based on the configured scrambling identifier and with reference to a preset calculation rule.

In an optional implementation, an association relationship between the scrambling identifier and the downlink control information configuration information or the downlink control parameter is predefined, or is configured by using at least one of radio resource control RRC signaling, downlink control information DCI signaling, and MAC-CE signaling.

In an optional implementation, the association relationship between the scrambling identifier and the downlink control information configuration information or the downlink control parameter may be configured in an explicit configuration manner or an implicit configuration manner. The explicit configuration manner means that corresponding indication information is used to indicate the association relationship, or the association relationship is predefined. The implicit configuration manner means that no corresponding indication information is used to clearly indicate the association relationship or the association relationship is not clearly predefined, but the association relationship may be agreed on, for example, a mutual inclusion relationship is agreed on.

In another optional implementation, the data channel configuration information carrying the scrambling identifier is associated with the downlink control information configuration information or the downlink control parameter. An association relationship between the data channel configuration information and the downlink control information configuration information or the downlink control parameter is predefined, or is configured by using radio resource control (Radio resource control, RRC) signaling, downlink control information (Downlink control information, DCI) signaling, or media access control control element (Media Access Control control element, MAC-CE) signaling.

Similarly, the association relationship between the data channel configuration information and the downlink control information configuration information or the downlink control parameter may be configured in an explicit configuration manner or an implicit configuration manner.

Correspondingly, the terminal device may learn of the association relationship in at least one of the following manners: obtaining the association relationship predefined in a protocol, receiving the association relationship sent through the signaling, or obtaining the association relationship based on the foregoing implicit configuration manner or explicit configuration manner.

The following describes the implicit configuration manner and the explicit configuration manner with reference to the accompanying drawings.

The term "larger" or "smaller" in this specification means that the downlink control information configuration information or a downlink control information configuration information index number determined by the network device or the terminal device is larger or smaller in a plurality of pieces of downlink control information configuration information or a plurality of downlink control information configuration information index numbers configured by using signaling. Specifically, a threshold may be used to determine whether the determined downlink control information configuration information or downlink control information configuration information index number is larger or smaller. Correspondingly, the "larger" or "smaller" herein may alternatively mean that the downlink control parameter or a downlink control parameter index number determined by the network device or the terminal device is larger or smaller in a plurality of downlink control parameters or a plurality of downlink control parameter index numbers configured by using signaling. Specifically, a threshold may be used to determine whether the determined downlink control parameter or downlink control parameter index number is larger or smaller. Correspondingly, a smaller/larger scrambling identifier, a smaller/larger scrambling identifier index number, smaller/larger data channel configuration information, or a smaller/larger data channel configuration information index number has the same meaning. Details are not described herein again.

1 Explicit Configuration Manner 1.1 Configure a Correspondence Between Each Scrambling Identifier and Each Piece of Downlink Control Information Configuration Information or Each Downlink Control Parameter by Using Signaling.

For example, a correspondence between each scrambling identifier or each scrambling identifier index number and each piece of downlink control information configuration information or each downlink control information configuration information index number is configured in the data channel configuration information such as the PDSCH-Config/PUSCH-Config by using the signaling. Alternatively, a correspondence between each scrambling identifier or each scrambling identifier index number and each downlink control parameter or each downlink control parameter index number is configured in the data channel configuration information or the downlink control information configuration information such as the PDSCH-Config/PUSCH-Config/PDCCH-Config by using the signaling.

In this case, the network device or the terminal device determines the downlink control information configuration information or the downlink control parameter, to scramble or descramble the data by using the scrambling identifier corresponding to the downlink control information configuration information or the scrambling identifier corresponding to the downlink control parameter.

Figure 2A:
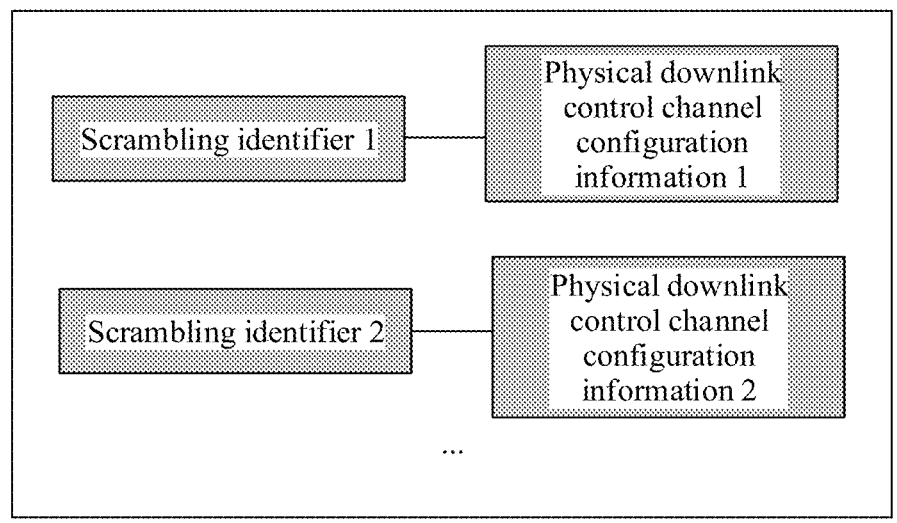
FIG. 2a to FIG. 2c each are a schematic diagram of a scrambling identifier configuration manner according to an embodiment of this application.
Figure 2B:
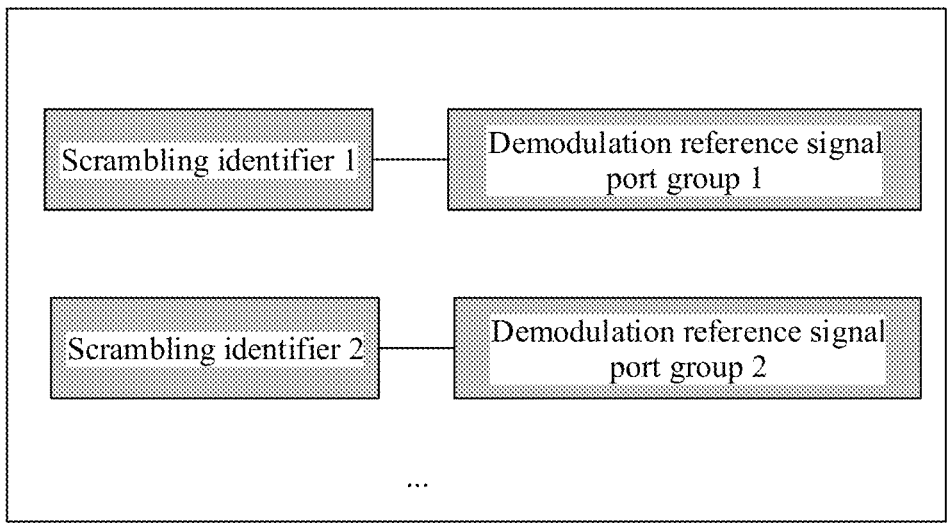
Figure 2C:
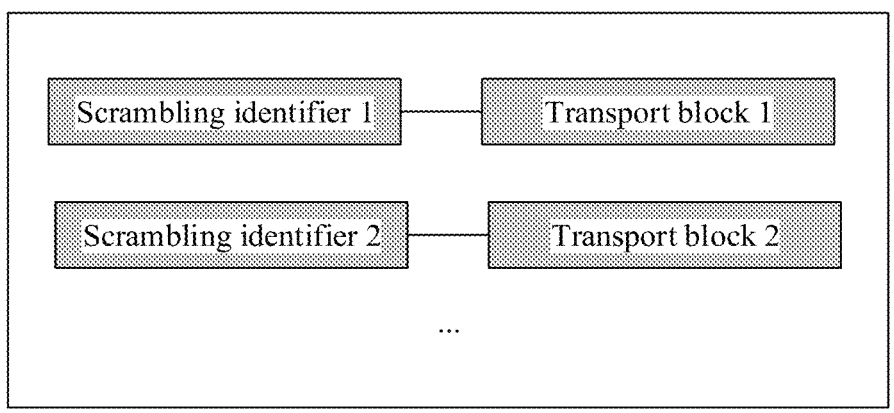

For example, the downlink control information configuration information is the PDCCH-Config, and the downlink control parameter is the DMRS port group index number or a TB index number. FIG. 2a to FIG. 2c each are a schematic diagram of a scrambling identifier configuration manner according to an embodiment of this application. As shown in FIG. 2a, a correspondence between each scrambling identifier index number and each PDCCH-Config index number is configured in a PDSCH-Config/PUSCH-Config. As shown in FIG. 2b, a correspondence between each scrambling identifier index number and each DMRS port group index number is configured in a PDSCH-Config/PUSCH-Config/PDCCH-Config. As shown in FIG. 2c, a correspondence between each scrambling identifier index number and each TB index number is configured in a PDSCH-Config/PUSCH-Config/PDCCH-Config.

For example, in FIG. 2a, the downlink control information configuration information is the PDCCH-Config. Based on a plurality of PDCCH-Configs configured by the communications device, the terminal device can detect a PDCCH-Config of a PDCCH, and the PDCCH-Config is denoted as a PDCCH-Config 1. Assuming that the UE detects a PDCCH 1 based on the PDCCH-Config 1, the terminal device may learn, based on the PDSCH-Config/PUSCH-Config that is configured by using the signaling and that is shown in FIG. 2a, that a scrambling identifier corresponding to the PDCCH-Config 1 is a scrambling identifier 1. DCI that is carried on the PDCCH 1 detected by the terminal device is denoted as DCI 1. In this way, the terminal device may descramble, by using the scrambling identifier 1, downlink data scheduled by using the DCI 1, or may scramble, by using the scrambling identifier 1, uplink data scheduled by using the DCI 1.

For example, in FIG. 2b, the downlink control parameter is the DMRS port group index number, and a parameter, in the downlink control information, that is related to the DMRS port group index number is the antenna port or the antenna port index number. DCI detected by the terminal device is denoted as DCI 1. The terminal device obtains a corresponding DMRS port group index number based on an antenna port index number carried in the DCI 1, and the corresponding DMRS port group index number is denoted as a DMRS port group 1. The terminal device may learn, based on the PDSCH-Config/PUSCH-Config that is configured by using the signaling and that is shown in FIG. 2b, that a scrambling identifier corresponding to the DMRS port group 1 is a scrambling identifier 1. In this way, the terminal device may descramble, by using the scrambling identifier 1, downlink data scheduled by using the DCI 1, or may scramble, by using the scrambling identifier 1, uplink data scheduled by using the DCI 1.

For example, in FIG. 2c, the downlink control parameter is the TB index number, a parameter, in the downlink control information, that is related to the TB index number is a DCI format 1_1. The DCI format 1_1 includes configuration information of two TBs, for example, a TB 1 and a TB 2. In the DCI format 1_1, parameters corresponding to each TB are an MCS, an NDI, and an RV. In NR, the DCI format 1_1 supports enabling one TB and disabling (disable) the other TB. In parameters corresponding to a TB, when MCS=26 and RV=1, the TB is disabled. When values of the MCS and the RV of the other TB are normal, the TB is enabled. For example, in FIG. 2c, the DCI detected by the terminal device is denoted as DCI 1. The terminal device determines an enabled TB based on the configuration information of the TBs in the DCI format 1_1 in the DCI 1, and the enabled TB is denoted as the TB 1. The terminal device may learn, based on the PDSCH-Config/PUSCH-Config that is configured by using the signaling and that is shown in FIG. 2c, that a scrambling identifier corresponding to the TB 1 is a scrambling identifier 1. In this way, the terminal device may descramble, by using the scrambling identifier 1, downlink data scheduled by using the DCI 1, or may scramble, by using the scrambling identifier 1, uplink data scheduled by using the DCI 1.

1.2 Configure a Correspondence Between Each Piece of Data Channel Configuration Information and Each Piece of Downlink Control Information Configuration Information or Each Downlink Control Parameter by Using Signaling.

In this case, the network device or the terminal device determines the downlink control information configuration information or the downlink control parameter, and further needs to determine the data channel configuration information associated with the downlink control information configuration information or the downlink control parameter, to scramble or descramble the data by using the scrambling identifier included in the data channel configuration information.

Figure 3A:
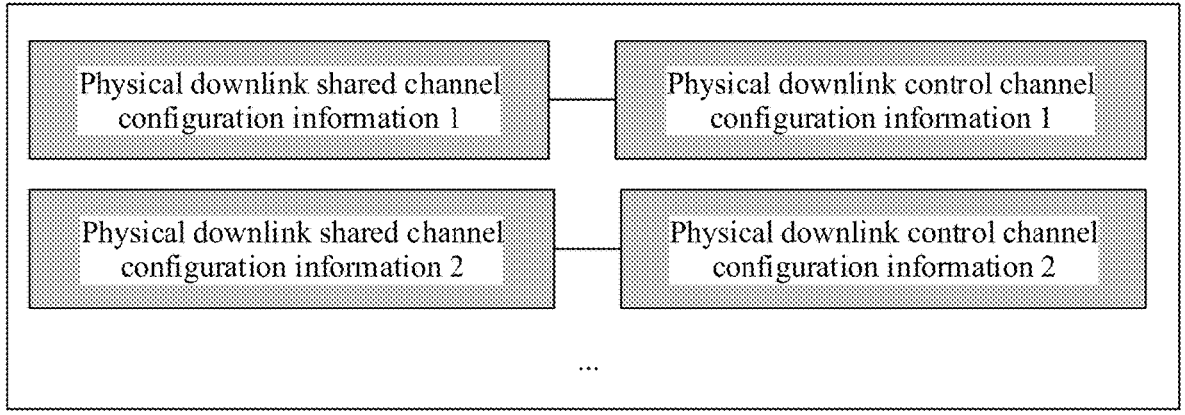
FIG. 3a to FIG. 3c each are a schematic diagram of another scrambling identifier configuration manner according to an embodiment of this application.
Figure 3B:
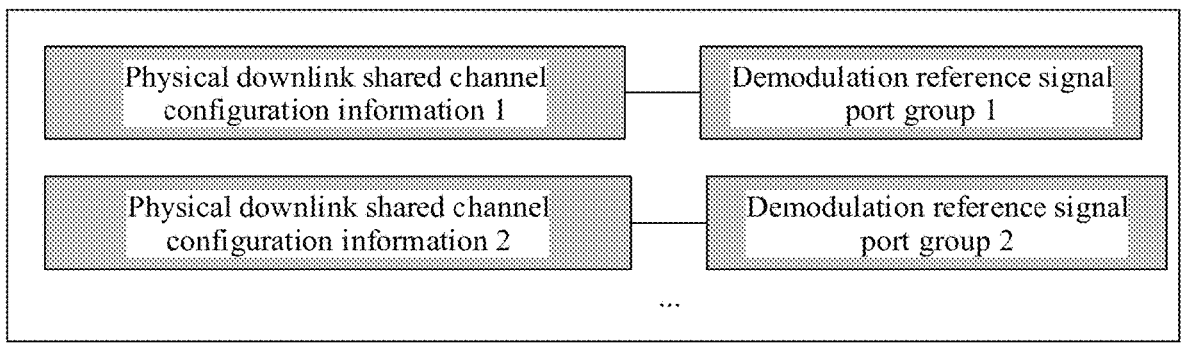
Figure 3C:
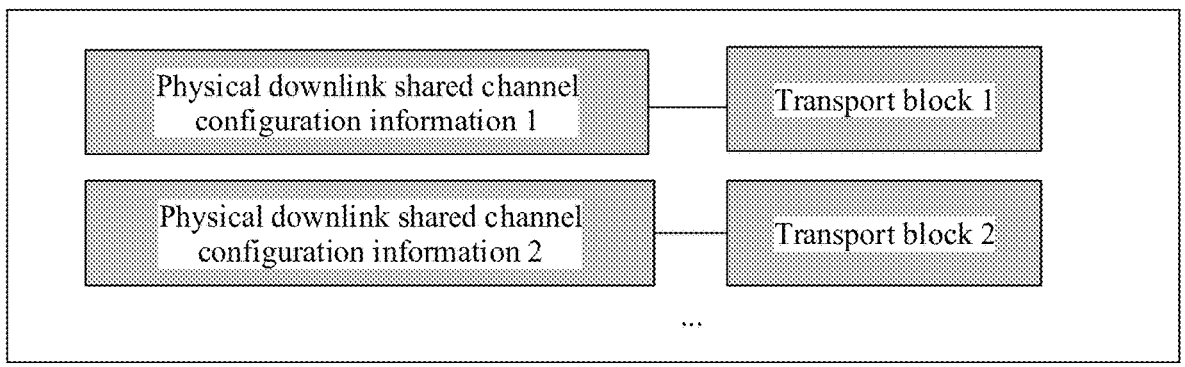

For example, the data channel configuration information is the PDSCH-Config, the downlink control information configuration information is the PDCCH-Config, and the downlink control parameter is the DMRS port group index number or a TB index number. FIG. 3a to FIG. 3c each are a schematic diagram of another scrambling identifier configuration manner according to an embodiment of this application. As shown in FIG. 3a, a correspondence between each PDSCH-Config index number and each PDCCH-Config index number is configured in a structure or configuration information. The structure or the configuration information may be a downlink dedicated bandwidth part (bandwidth part-Downlink Dedicated, BWP-Downlink Dedicated) or a bandwidth part information element (bandwidth part information element, BWP-information element). As shown in FIG. 3b, a correspondence between each PDSCH-Config index number and each DMRS port group index number is configured in a structure or configuration information (for example, the PDCCH-Config). As shown in FIG. 3c, a correspondence between each PDSCH-Config index number and each TB index number is configured in a structure or configuration information (for example, the PDCCH-Config).

For example, the structure or the configuration information is a downlink dedicated bandwidth part (bandwidth part-Downlink Dedicated, BWP-Downlink Dedicated) or a bandwidth part information element (bandwidth part information element, BWP-information element).

For example, in FIG. 3a, the terminal device can detect, based on a plurality of PDCCH-Configs configured by the communications device, a PDCCH-Config of a PDCCH, and the PDCCH-Config is denoted as a PDCCH-Config 1. In this case, the terminal device may obtain, based on the structure that is configured by using the signaling and that is shown in FIG. 3a, a PDSCH-Config associated with the PDCCH-Config 1, and the PDSCH-Config is denoted as a PDSCH-Config 1. A scrambling identifier included in the PDSCH-Config 1 is denoted as a scrambling identifier 1. DCI carried on the PDCCH detected by the terminal device is denoted as DCI 1. In this way, the terminal device may descramble, by using the scrambling identifier 1, downlink data scheduled by using the DCI 1.

For example, in FIG. 3b, the downlink control parameter is the DMRS port group index number, and a parameter, in the downlink control information, that is related to the DMRS port group index number is the antenna port or the antenna port index number. DCI carried on a PDCCH detected by the terminal device is denoted as DCI 1. The terminal device obtains a corresponding DMRS port group index number based on an antenna port index number in the DCI 1, and the corresponding DMRS port group index number is denoted as a DMRS port group 1. The terminal device may obtain, based on a structure that is configured by using signaling and that is shown in FIG. 3b, a PDSCH-Config associated with the DMRS port group 1, and the PDSCH-Config is denoted as a PDSCH-Config 1. In this way, the terminal device may descramble, by using a scrambling identifier 1 included in the PDSCH-Config 1, downlink data scheduled by using the DCI 1.

For example, in FIG. 3c, DCI detected by the terminal device is denoted as DCI 1. The terminal device determines an enabled TB based on configuration information of TBs in a DCI format 1_1 in the DCI 1, and the enabled TB is denoted as a TB 1. The terminal device may obtain, based on a structure that is configured by using signaling and that is shown in FIG. 3c, a PDSCH-Config associated with the TB 1, and the PDSCH-Config is denoted as a PDSCH-Config 1. In this way, the terminal device may descramble, by using a scrambling identifier 1 included in the PDSCH-Config 1, downlink data scheduled by using the DCI 1.

1.3 Clearly Predefine an Association Relationship Between Each Scrambling Identifier and Each Piece of Downlink Control Information Configuration Information or Each Downlink Control Parameter.

In an optional implementation, scrambling identifiers sorted in descending order or scrambling identifier index numbers sorted in descending order correspond to downlink control information configuration information sorted in descending order or downlink control information configuration information index numbers sorted in descending order. For example, the downlink control information configuration information is the PDCCH-Config, the scrambling identifiers configured by the communications device for the terminal device are a scrambling identifier 1, a scrambling identifier 2, and a scrambling identifier 3, and PDCCH-Configs configured for the terminal device is a PDCCH-Config 1, a PDCCH-Config 2, and a PDCCH-Config 3. In this case, the scrambling identifier 3 is associated with the PDCCH-Config 3, the scrambling identifier 2 is associated with the PDCCH-Config 2, and the scrambling identifier 1 is associated with the PDCCH-Config 1. In this case, the terminal device detects a PDCCH-Config of a PDCCH, and the PDCCH-Config is denoted as a PDCCH-Config 1, so that the terminal device may determine, according to the foregoing predefined rule, that a scrambling identifier corresponding to the PDCCH-Config 1 is the scrambling identifier 1. In this way, the terminal device may scramble or descramble, by using the scrambling identifier 1, data scheduled by using DCI carried on the detected PDCCH.

In this embodiment of this application, an example in which the network device configures three scrambling identifiers for the terminal device is assumed. Actually, there may be another quantity of scrambling identifiers, for example, two or more scrambling identifiers.

In another optional implementation, scrambling identifiers sorted in ascending order or scrambling identifier index numbers sorted in ascending order correspond to downlink control information configuration information sorted in descending order or downlink control information configuration information index numbers sorted in descending order. For example, in the foregoing scrambling identifiers and PDCCH-Configs that are configured by the communications device, the scrambling identifier 1 is associated with the PDCCH-Config 3, the scrambling identifier 2 is associated with the PDCCH-Config 2, and the scrambling identifier 3 is associated with the PDCCH-Config 1. In this case, the terminal device determines that a scrambling identifier corresponding to the PDCCH-Config 1 is the scrambling identifier 3. In this way, the terminal device may scramble or descramble, by using the scrambling identifier 3, the data scheduled by using the DCI carried on the detected PDCCH.

In still another optional implementation, scrambling identifiers sorted in descending order or scrambling identifier index numbers sorted in descending order correspond to downlink control parameters sorted in descending order or downlink control parameter index numbers sorted in descending order. For example, the downlink control parameter is the DMRS port group index number, the scrambling identifiers configured by the communications device for the terminal device are a scrambling identifier 1, a scrambling identifier 2, and a scrambling identifier 3, and DMRS port groups configured for the terminal device are a DMRS port group 1, a DMRS port group 2, and a DMRS port group 3. In this case, the scrambling identifier 3 is associated with the DMRS port group 3, the scrambling identifier 2 is associated with the DMRS port group 2, and the scrambling identifier 1 is associated with the DMRS port group 1. In this case, DCI detected by the terminal device is denoted as DCI 1; and the terminal device obtains a corresponding DMRS port group based on an antenna port or an antenna port index number in the DCI 1, and the DMRS port group is denoted as the DMRS port group 1, so that the terminal device may determine, according to the predefined rule, that a scrambling identifier corresponding to the DMRS port group 1 is the scrambling identifier 1. In this way, the terminal device may scramble or descramble, by using the scrambling identifier 1, data scheduled by using the DCI 1.

For another example, the downlink control parameter is a TB index number, the scrambling identifiers configured by the communications device for the terminal device are a scrambling identifier 1 and a scrambling identifier 2, and TBs configured for the terminal device are a TB 1 and a TB 2. In this case, the scrambling identifier 2 is associated with the TB 2, and the scrambling identifier 1 is associated with the TB 1. In this case, DCI detected by the terminal device is denoted as DCI 1; and the terminal device obtains an enabled TB based on a TB-related parameter in the DCI 1. If the enabled TB is the TB 1, the terminal device may determine, based on the predefined association relationship, that a scrambling identifier corresponding to the TB 1 is the scrambling identifier 1. In this way, the terminal device may scramble or descramble, by using the scrambling identifier 1, data scheduled by using the DCI 1.

In still another optional implementation, scrambling identifiers sorted in ascending order or scrambling identifier index numbers sorted in ascending order correspond to downlink control parameters sorted in descending order or downlink control parameter index numbers sorted in descending order. For example, based on the foregoing scrambling identifiers and DMRS port groups that are configured by the communications device for the terminal device, the scrambling identifier 1 is associated with the DMRS port group 3, the scrambling identifier 2 is associated with the DMRS port group 2, and the scrambling identifier 3 is associated with the DMRS port group 1. In this case, the terminal device may determine, according to the predefined rule, that a scrambling identifier corresponding to the DMRS port group 1 is the scrambling identifier 3. In this way, the terminal device may scramble or descramble, by using the scrambling identifier 3, the data scheduled by using the DCI 1.

For another example, the downlink control parameter is a TB index number, the scrambling identifiers configured by the communications device for the terminal device are a scrambling identifier 1 and a scrambling identifier 2, and TBs configured for the terminal device are a TB 1 and a TB 2. In this case, the scrambling identifier 1 is associated with the TB 2, and the scrambling identifier 2 is associated with the TB 1. In this case, DCI detected by the terminal device is denoted as DCI 1; and the terminal device obtains an enabled TB based on a TB-related parameter in the DCI 1. If the enabled TB is the TB 1, the terminal device may determine, based on the predefined association relationship, that a scrambling identifier associated with the TB 1 is the scrambling identifier 2. In this way, the terminal device may scramble or descramble, by using the scrambling identifier 2, data scheduled by using the DCI 1.

In still another optional implementation, when the network device configures the one scrambling identifier, and generates the one or more other scrambling identifiers based on the configured scrambling identifier and according to the preset calculation rule, a different association relationship may be predefined for the configured scrambling identifier and the generated other scrambling identifiers.

For example, the network device configures only one scrambling identifier, which is denoted as an ID 1, and another scrambling identifier is obtained based on the configured scrambling identifier 1 and according to the preset calculation rule, and is denoted as an ID 2. For example, the preset calculation rule is ID 2=(ID 1+N), where N is an integer. For example, $N=2^Q$, where Q is a natural number. For example, Q=9, 10, 11, 12, or 13. When a value range of the ID 1 is 0 to $2^{10}-1$, if Q=10, it can be ensured that a value range of the ID 2 is $2^{10}$ to $2*2^{10}-1$. In this way, the value range of the ID 2 does not conflict with the value range of the ID 1, and it is ensured that a value of the ID 2 starts from a minimum value beyond the value range of the ID 1, so that a bit width can be reduced. For another example, the preset calculation rule is ID 2=mod((ID 1+N), M), where N is an integer. For example, $N=2^Q$, where Q is a natural number. For example, Q=9, 10, 11, 12, or 13. Similarly, if Q=10, the value range of the ID 2 does not conflict with the value range of the ID 1, and it is ensured that the value of the ID 2 starts from the minimum value beyond the value range of the ID 1, so that a bit width can be reduced. M is an integer, for example, $M=2^P$. P is a natural number. If P=14, a conflict between values of the ID 2 and the ID 1 can be avoided.

In an optional implementation, in a multi-station coordination scenario, a plurality of pieces of DCI sent by a network side may include primary DCI and secondary DCI, and the primary DCI includes more parameters or indication information than the secondary DCI. In this case, a downlink control parameter or downlink control information configuration information corresponding to the primary DCI is associated with the scrambling identifier configured by the communications device; and a downlink control parameter or downlink control information configuration information corresponding to the secondary DCI is associated with the generated scrambling identifier. When a plurality of scrambling identifiers are generated, the association relationship configured in the foregoing implicit configuration manner may be used to further determine an association relationship between each generated scrambling identifier and each downlink control parameter or each piece of downlink control information configuration information. For example, the terminal device detects DCI 1, and a parameter type included in the DCI 1 is more complete, or the DCI 1 includes a specific parameter or some specific parameters, for example, carrier indication information (Carrier indicator), BWP indication information (Bandwidth part indicator), rate matching indication information (Rate matching indicator), or ZP CSI-RS trigger information (ZP CSI-RS trigger). In this case, it may be determined that the DCI 1 is the primary DCI, and data scheduled by using the DCI 1 may be scrambled or descrambled by using a scrambling identifier 1 configured by the communications device. Correspondingly, the terminal device detects DCI 2, and the DCI 2 includes fewer parameter types or the DCI 2 does not include a specific parameter or some specific parameters, for example, carrier indication information (Carrier indicator), BWP indication information (Bandwidth part indicator), rate matching indication information (Rate matching indicator), or ZP CSI-RS trigger information (ZP CSI-RS trigger). In this case, the DCI 2 is the secondary DCI, and the terminal device scrambles or descrambles, by using a generated scrambling identifier 2, data scheduled by using the DCI 2.

Alternatively, the predefined association relationship may be reversed. To be specific, the downlink control parameter or the downlink control information configuration information corresponding to the primary DCI is associated with the generated scrambling identifier; and the downlink control parameter or the downlink control information configuration information corresponding to the secondary DCI is associated with the configured scrambling identifier.

In another optional implementation, larger downlink control information configuration information or a larger downlink control information configuration information index number may be associated with the scrambling identifier configured by the communications device; or a larger downlink control parameter or a larger downlink control parameter index number is associated with the scrambling identifier configured by the communications device. Smaller downlink control information configuration information or a smaller downlink control information configuration information index number may be associated with the generated scrambling identifier; or a smaller downlink control parameter or a smaller downlink control parameter index number is associated with the generated scrambling identifier.

Alternatively, conversely, smaller downlink control information configuration information or a smaller downlink control information configuration information index number may be associated with the scrambling identifier configured by the communications device; or a smaller downlink control parameter or a smaller downlink control parameter index number is associated with the scrambling identifier configured by the communications device. Larger downlink control information configuration information or a larger downlink control information configuration information index number may be associated with the generated scrambling identifier; or a larger downlink control parameter or a larger downlink control parameter index number is associated with the generated scrambling identifier.

When a plurality of scrambling identifiers are generated, the association relationship between each generated scrambling identifier and each downlink control parameter or each piece of downlink control information configuration information may be configured in the configuration manner described in another part of the embodiments of this application. Details are not described herein again.

1.4 Clearly Predefine an Association Relationship Between Each Piece of Data Channel Configuration Information and Each Piece of Downlink Control Information Configuration Information or Each Downlink Control Parameter.

In an optional implementation, data channel configuration information sorted in descending order or data channel configuration information index numbers sorted in descending order correspond to downlink control information configuration information sorted in descending order or downlink control information configuration information index numbers sorted in descending order. For example, the data channel configuration information is the PDSCH-Config, and the downlink control information configuration information is the PDCCH-Config. It is assumed that PDSCH-Configs configured by the communications device for the terminal device are a PDSCH-Config 1, a PDSCH-Config 2, and a PDSCH-Config 3; and PDCCH-Configs configured by the communications device for the terminal device are a PDCCH-Config 1, a PDCCH-Config 2, and a PDCCH-Config 3. In this case, according to the predefined rule, the PDSCH-Config 3 is associated with the PDCCH-Config 3, the PDSCH-Config 2 is associated with the PDCCH-Config 2, and the PDSCH-Config 1 is associated with the PDCCH-Config 1. Correspondingly, the terminal device detects a PDCCH-Config of a PDCCH, and the PDCCH-Config is denoted as the PDCCH-Config 1; and DCI carried on the PDCCH detected by the terminal device is DCI 1, so that the terminal device determines, according to the predefined rule, that a PDSCH-Config associated with the PDCCH-Config 1 is the PDSCH-Config 1; and the terminal device scrambles or descrambles, by using a scrambling identifier included in the PDSCH-Config 1, data scheduled by using the DCI 1.

In an optional implementation, data channel configuration information sorted in ascending order or data channel configuration information index numbers sorted in ascending order correspond to downlink control information configuration information sorted in descending order or downlink control information configuration information index numbers sorted in descending order; data channel configuration information sorted in descending order or data channel configuration information index numbers sorted in descending order correspond to downlink control parameters sorted in descending order or downlink control parameter index numbers sorted in descending order; or data channel configuration information sorted in ascending order or data channel configuration information index numbers sorted in ascending order correspond to downlink control parameters sorted in descending order or downlink control parameter index numbers sorted in descending order. Based on the PDCCH-Configs and PDSCH-Configs configured in the example in the foregoing implementation, according to the rule predefined in this implementation, the PDSCH-Config 1 is associated with the PDCCH-Config 3, the PDSCH-Config 2 is associated with the PDCCH-Config 2, and the PDSCH-Config 3 is associated with the PDCCH-Config 1. Correspondingly, the terminal device determines that a PDSCH-Config associated with the PDCCH-Config 1 is the PDSCH-Config 3; and the terminal device scrambles or descrambles, by using a scrambling identifier included in the PDSCH-Config 3, the data scheduled by using the DCI 1.

1.5 Determine the Scrambling Identifier Based on the Downlink Control Parameter

One scrambling identifier is configured by using higher layer signaling. For example, one scrambling identifier denoted as PDSCHScramblingIdentity0/PUSCHScramblingIdentity0 is configured by using RRC signaling. Alternatively, a plurality of scrambling identifiers are configured by using higher layer signaling. For example, two scrambling identifiers denoted as PDSCHScramblingIdentity0/PUSCHScramblingIdentity0 and PDSCHScramblingIdentity1/PUSCHScramblingIdentity1 are configured by using RRC signaling.

The downlink control information includes indication information, and the indication information may be used to determine the scrambling identifier configured by using the higher layer signaling. The indication information may be 1 bit. When a value of the 1 bit is "0", it indicates that the scrambling identifier is PDSCHScramblingIdentity0/PUSCHScramblingIdentity0; or when a value of the 1 bit is "1", it indicates that the scrambling identifier is PDSCHScramblingIdentity1/PUSCHScramblingIdentity1.

In a possible implementation, the indication information may be "DMRS sequence initialization" used to indicate DMRS sequence initialization.

In a possible implementation, an initial state of the scrambling sequence used for data scrambling is:

$$c_{init} = n_{RNTI} \cdot 2^{15} + q \cdot 2^{14} + n_{ID}^{nSCID}$$

$n_{SCID} \in \{0,1\}$ is obtained by using the indication information included in the DCI, for example, is obtained by using the DMRS sequence initialization indication information included in the DCI. If the indication information is 0, $n_{SCID}=0$. If the indication information is 1, $n_{SCID}=1$. If the DCI does not include the indication information, $n_{SCID}=0$ by default. $n_{ID}^0, n_{ID}^1$ respectively correspond to PDSCHScramblingIdentity0/PUSCHScramblingIdentity0 and PDSCHScramblingIdentity1/PUSCHScramblingIdentity1 configured by using the higher layer signaling.

In another possible implementation, if the terminal device has a capability of supporting different scrambling identifiers, the terminal device does not expect values of indication information in two pieces of DCI received within a time period (for example, one slot) to be the same, or the terminal device does not expect values of indication information carried in DCI corresponding to different downlink control information configuration information to be the same.

If the terminal device does not support multi-DCI based non-coherent transmission, does not support receiving of two pieces of DCI in a same time unit (for example, one slot slot), or does not support being configured with a plurality of scrambling identifiers, a plurality of pieces of data channel configuration information, a plurality of pieces of downlink control information configuration information, or the like, the terminal device does not expect the received DCI to carry the indication information, or regardless of the value of the indication information in the DCI, the terminal device assumes that the value of the indication information is 0 (or 1).

2 Implicit Configuration Manner

The implicit configuration manner means that no corresponding indication information is used to clearly indicate an association relationship between each scrambling identifier and each piece of downlink control information configuration information or each downlink control parameter, or an association relationship between each scrambling identifier and each piece of downlink control information configuration information or each downlink control parameter is not clearly predefined, but the association relationship may be agreed on, for example, a mutual inclusion relationship is agreed on. Correspondingly, the implicit configuration manner may alternatively mean that no corresponding indication information is used to clearly indicate an association relationship between each piece of data channel configuration information and each piece of downlink control information configuration information or each downlink control parameter, or an association relationship between each piece of data channel configuration information and each piece of downlink control information configuration information or each downlink control parameter is not clearly predefined, but the association relationship may be agreed on, for example, a mutual inclusion relationship is agreed on. The following provides detailed descriptions by using a plurality of optional implementations.

2.1 the Downlink Control Information Configuration Information or the Downlink Control Parameter Includes the Scrambling Identifier or a Scrambling Identifier Index Number.

If the downlink control information configuration information or the downlink control parameter configured by using the signaling includes the scrambling identifier or the scrambling identifier index number, the scrambling identifier or a scrambling identifier corresponding to the scrambling identifier index number is associated with the downlink control information configuration information or the downlink control parameter.

In this case, after determining the downlink control information configuration information or the downlink control parameter, the network device or the terminal device may scramble or descramble the data by using the scrambling identifier corresponding to the downlink control information configuration information or the downlink control parameter. The data is the data corresponding to the downlink control information; and the downlink control information is the downlink control information carried on the downlink control channel that is obtained based on the downlink control information configuration information, is the downlink control information including the downlink control parameter, or is the downlink control information including the parameter related to the downlink control parameter.

For example, the downlink control information configuration information is the PDCCH-Config, and the downlink control parameter is the DMRS port group parameter. FIG. 4a and FIG. 4b each are a schematic diagram of still another scrambling identifier configuration manner according to an embodiment of this application. As shown in FIG. 4a, a scrambling identifier included in the PDCCH-Config may be indicated by a scrambling identifier index number. That a PDCCH-Config 1 includes a scrambling identifier 1 indicates that the PDCCH-Config 1 is associated with the scrambling identifier 1; and that a PDCCH-Config 2 includes a scrambling identifier 2 indicates that the PDCCH-Config 2 is associated with the scrambling identifier 2. As shown in FIG. 4b, the DMRS port group parameter and a scrambling identifier included in the DMRS port group parameter may be indicated by an index number. That a DMRS port group parameter 1 includes a scrambling identifier 1 indicates that the DMRS port group parameter 1 is associated with the scrambling identifier 1; and that a DMRS port group parameter 2 includes a scrambling identifier 2 indicates that the DMRS port group parameter 2 is associated with the scrambling identifier 2.

Correspondingly, for example, in FIG. 4a, a PDCCH-Config of a PDCCH detected by the terminal device is the PDCCH-Config 1, and the terminal device may determine, based on FIG. 4a, that a scrambling identifier associated with the PDCCH-Config 1 is the scrambling identifier 1. In this way, the terminal device may scramble or descramble, by using the scrambling identifier 1, data scheduled by using DCI carried on the detected PDCCH.

For example, in FIG. 4b, DCI detected by the terminal device is DCI 1, a DMRS port is obtained based on a parameter (for example, an antenna port or an antenna port index number) in the DCI 1, and a DMRS port group parameter obtained based on the DMRS port is a DMRS port group parameter 1. In this case, the terminal device may determine, based on FIG. 4b, that a scrambling identifier associated with the DMRS port group parameter 1 is the scrambling identifier 1, and the terminal device may scramble or descramble, by using the scrambling identifier 1, data scheduled by using the DCI 1.

2.2 the Downlink Control Information Configuration Information, the Data Channel Configuration Information, Another Structure, or Other Configuration Information Includes Both the Downlink Control Parameter or the Downlink Control Parameter Index Number, and the Scrambling Identifier or the Scrambling Identifier Index Number; or the Data Channel Configuration Information, Another Structure, or Other Configuration Information Includes Both the Downlink Control Information Configuration Information or the Downlink Control Information Configuration Information Index Number, but Also Includes the Scrambling Identifier or the Scrambling Identifier Index Number.

To be specific, if the downlink control information configuration information, the data channel configuration information, or the another structure, configured by using the signaling, includes both the downlink control parameter or the downlink control parameter index number, and the scrambling identifier or the scrambling identifier index number, it indicates that the downlink control parameter or a downlink control parameter corresponding to the downlink control parameter index number is associated with the scrambling identifier or a scrambling identifier corresponding to the scrambling identifier index number.

Alternatively, if the data channel configuration information or the another structure, configured by using the signaling, includes both the downlink control information configuration information or the downlink control information configuration information index number, and the scrambling identifier or the scrambling identifier index number, it indicates that the downlink control information configuration information or a downlink control information configuration information corresponding to the downlink control information configuration information index number is associated with the scrambling identifier or a scrambling identifier corresponding to the scrambling identifier index number.

Alternatively, if a scrambling identifier parameter includes both the downlink control parameter or the downlink control parameter index number, and the scrambling identifier or the scrambling identifier index number, it indicates that the downlink control parameter or a downlink control parameter corresponding to the downlink control parameter index number is associated with the scrambling identifier or a scrambling identifier corresponding to the scrambling identifier index number; or if a scrambling identifier parameter includes both the downlink control information configuration information or the downlink control information configuration information index number, and the scrambling identifier or the scrambling identifier index number, it indicates that the downlink control information configuration information or downlink control information configuration information corresponding to the downlink control information configuration information index number is associated with the scrambling identifier or a scrambling identifier corresponding to the scrambling identifier index number.

For example, the downlink control information configuration information is the PDCCH-Config, and the downlink control parameter is the DMRS port group index number. FIG. 5a is a schematic diagram of still another scrambling identifier configuration manner according to an embodiment of this application. As shown in FIG. 5a, a PDCCH-Config 1/PDSCH-Config 1/PUSCH-Config 1/scrambling identifier parameter 1 includes both a scrambling identifier 1 and a DMRS port group 1, and it indicates that the DMRS port group 1 is associated with the scrambling identifier 1; and a PDCCH-Config 2/PDSCH-Config 2/PUSCH-Config 2/scrambling identifier parameter 2 includes both a scrambling identifier 2 and a DMRS port group 2, and it indicates that the DMRS port group 2 is associated with the scrambling identifier 2.

Correspondingly, for example, in FIG. 5a, DCI detected by the terminal device is DCI 1, a DMRS port is obtained based on a parameter (for example, an antenna port or an antenna port index number) in the DCI 1, and a DMRS port group obtained based on the DMRS port is the DMRS port group 1. In this case, the terminal device may determine, based on FIG. 5a, that a scrambling identifier associated with the DMRS port group 1 is the scrambling identifier 1, and the terminal device may scramble or descramble, by using the scrambling identifier 1, data scheduled by using the DCI 1.

For example, the downlink control information configuration information is the PDCCH-Config, and the data channel configuration information is the PDSCH-Config/PUSCH-Config. FIG. 5b is a schematic diagram of still another scrambling identifier configuration manner according to an embodiment of this application. As shown in FIG. 5b, a PDSCH-Config 1/PUSCH-Config 1 includes both a scrambling identifier 1 and a PDCCH-Config 1, and it indicates that the PDCCH-Config 1 is associated with the scrambling identifier 1; and a PDSCH-Config 2/PUSCH-Config 2 includes both a scrambling identifier 2 and a PDCCH-Config 2, and it indicates that the PDCCH-Config 2 is associated with the scrambling identifier 2.

Correspondingly, for example, in FIG. 5b, a PDCCH-Config of a PDCCH detected by the terminal device is the PDCCH-Config 1, and the terminal device learns, based on FIG. 5b, that a scrambling identifier associated with the PDCCH-Config 1 is the scrambling identifier 1. In this way, the terminal device scrambles or descrambles, by using the scrambling identifier 1, data scheduled by using DCI carried on the PDCCH that is obtained based on the PDCCH-Config 1.

For example, the downlink control information configuration information is the PDCCH-Config, the data channel configuration information is the PDSCH-Config/PUSCH-Config, and the downlink control parameter is a TB index number. FIG. 5c is a schematic diagram of still another scrambling identifier configuration manner according to an embodiment of this application. As shown in FIG. 5c, a PDCCH-Config 1/PDSCH-Config 1/PUSCH-Config 1/scrambling identifier parameter 1 includes both a scrambling identifier 1 and a TB 1, and it indicates that the TB 1 is associated with the scrambling identifier 1; and a PDCCH- Config 2/PDSCH-Config 2/PUSCH-Config 2/scrambling identifier parameter 2 includes both a scrambling identifier 2 and a TB 2, and it indicates that the TB 2 is associated with the scrambling identifier 2.

Correspondingly, for example, in FIG. 5c, DCI detected by the terminal device is DCI 1, and an enabled TB obtained based on a parameter (for example, a configuration parameter in a DCI-Format 1-1) in the DCI 1 is the TB 1. In this case, the terminal device may determine, based on FIG. 5c, that a scrambling identifier associated with the TB 1 is the scrambling identifier 1, and the terminal device may scramble or descramble, by using the scrambling identifier 1, data scheduled by using the DCI 1.

In an optional implementation, the network device configures a plurality of pieces of data channel configuration information, and each piece of data channel configuration information includes one scrambling identifier. Therefore, an association relationship between each piece of data channel configuration information and each piece of downlink control information configuration information or each downlink control parameter may be configured by using signaling or predefined, so that the terminal device may determine, based on the association relationship, the scrambling identifier associated with the downlink control information configuration information or the downlink control parameter. Configuring, in the explicit configuration manner, the association relationship between each piece of data channel configuration information and each piece of downlink control information configuration information or each downlink control parameter has been described above. Details are not described herein again. Configuring, in the implicit configuration manner, the association relationship between each piece of data channel configuration information and each piece of downlink control information configuration information or each downlink control parameter is described below with examples.

2.3 the Downlink Control Information Configuration Information or the Downlink Control Parameter Includes the Data Channel Configuration Information.

To be specific, if the downlink control information configuration information or the downlink control parameter configured by using the signaling includes the data channel configuration information or a data channel configuration information index number, it indicates that the downlink control information configuration information or the downlink control parameter is associated with the data channel configuration information or data channel configuration information corresponding to the data channel configuration information index number.

In this case, after determining the downlink control information configuration information or the downlink control parameter, the network device or the terminal device may determine the data channel configuration information included in the downlink control information configuration information or the downlink control parameter, to scramble or descramble the data by using the scrambling identifier included in the data channel configuration information. The data is the data corresponding to the downlink control information; and the downlink control information is the downlink control information carried on the downlink control channel that is obtained based on the downlink control information configuration information, is the downlink control information including the downlink control parameter, or is the downlink control information including the parameter related to the downlink control parameter.

For example, the downlink control information configuration information is the PDCCH-Config, the data channel configuration information is the PDSCH-Config, and the downlink control parameter is the DMRS port parameter. FIG. 6a to FIG. 6d each are a schematic diagram of still another scrambling identifier configuration manner according to an embodiment of this application.

As shown in FIG. 6a, a PDCCH-Config 1 includes a PDSCH-Config 1, and the PDSCH-Config 1 includes a scrambling identifier 1. Therefore, the PDCCH-Config 1 is associated with the PDSCH-Config 1, or the PDCCH-Config 1 is associated with the scrambling identifier 1. A PDCCH-Config 2 includes a PDSCH-Config 2, and the PDSCH-Config 2 includes a scrambling identifier 2. Therefore, the PDCCH-Config 2 is associated with the PDSCH-Config 2, or the PDCCH-Config 2 is associated with the scrambling identifier 2.

Figure 6B:
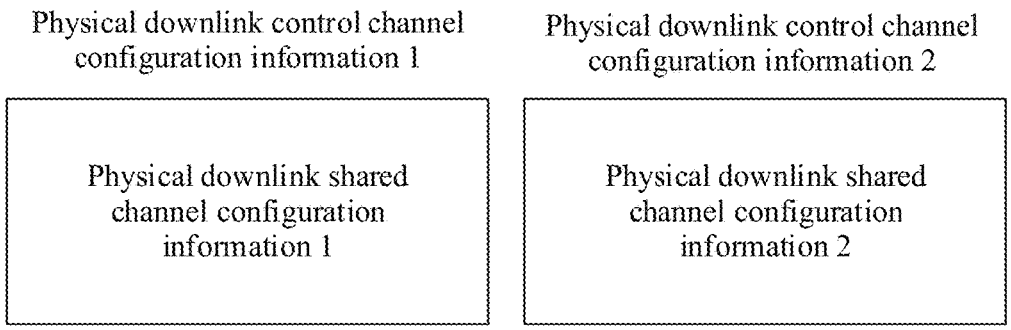

FIG. 6b differs from FIG. 6a in that a PDCCH-Config 1 in FIG. 6b includes an index number of a PDSCH-Config 1, but does not include entire content of the PDSCH-Config 1, and it still indicates that the PDCCH-Config 1 is associated with the PDSCH-Config 1, and is further associated with a scrambling identifier or a scrambling identifier index number included in the PDSCH-Config 1. Correspondingly, a PDCCH-Config 2 includes an index number of PDSCH-Config 2, but does not include entire content of the PDSCH-Config 2, and it still indicates that the PDCCH-Config 2 is associated with the PDSCH-Config 2. In this case, entire content of each PDSCH-Config may be additionally configured for the terminal device by using the signaling.

Figure 6C:
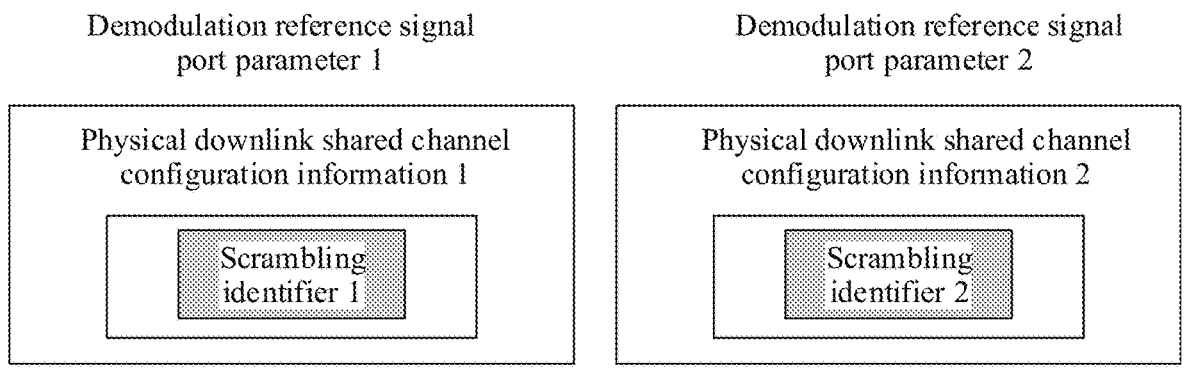

As shown in FIG. 6c, a DMRS port parameter 1 includes a PDSCH-Config 1, and the PDSCH-Config 1 includes a scrambling identifier 1. Therefore, the DMRS port parameter 1 is associated with the PDSCH-Config 1, or the DMRS port parameter 1 is associated with the scrambling identifier 1. ADMRS port parameter 2 includes a PDSCH-Config 2, and the PDSCH-Config 2 includes a scrambling identifier 2. Therefore, the DMRS port parameter 2 is associated with the PDSCH-Config 2, or the DMRS port parameter 2 is associated with the scrambling identifier 2.

Figure 6D:
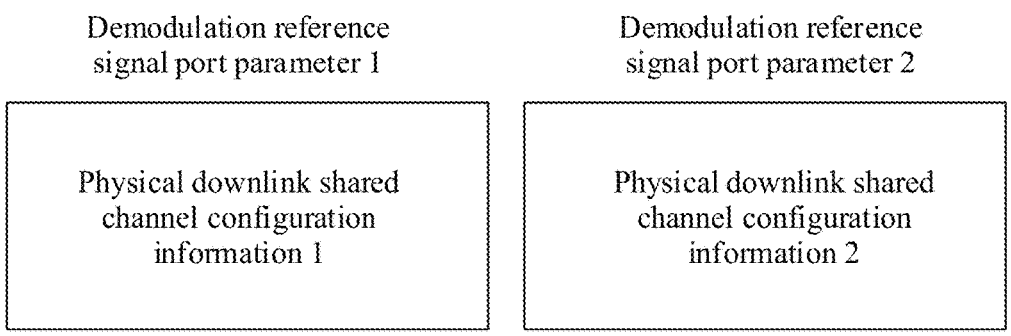

Similarly, FIG. 6d differs from FIG. 6c in that a DMRS port parameter 1 in FIG. 6d includes an index number of a PDSCH-Config 1, but does not include entire content of the PDSCH-Config 1, and it still indicates that the DMRS port parameter 1 is associated with the PDSCH-Config 1, and is further associated with a scrambling identifier or a scrambling identifier index number included in the PDSCH-Config 1. Correspondingly, a DMRS port parameter 2 includes a PDSCH-Config 2, but does not include entire content of the PDSCH-Config 2, and it still indicates that the DMRS port parameter 2 is associated with the PDSCH-Config 2. In this case, entire content of each PDSCH-Config may be additionally configured for the terminal device by using the signaling.

For example, in FIG. 6a or FIG. 6b, the terminal device detects a PDCCH-Config of a PDCCH, and the PDCCH-Config is denoted as the PDCCH-Config 1. The terminal device may learn, based on the relationship configured in FIG. 6a or FIG. 6b, that the PDCCH-Config 1 is associated with the PDSCH-Config 1. The terminal device may scramble or descramble, by using the scrambling identifier 1 included in the PDSCH-Config 1, data scheduled by using DCI that is carried on the PDCCH and that is detected based on the PDCCH-Config 1.

For example, in FIG. 6c or FIG. 6d, DCI detected by the terminal device is denoted as DCI 1. The terminal device obtains a DMRS port based on an antenna port or an antenna port index number in the DCI 1, and obtains the DMRS port group parameter 1 based on the DMRS port. The terminal device may learn, based on the relationship configured in FIG. 6c or FIG. 6d, that the DMRS port group parameter 1 is associated with the PDSCH-Config 1. The terminal device may scramble or descramble, by using the scrambling identifier 1 included in the PDSCH-Config 1, data scheduled by using the DCI 1.

2.4 the Downlink Control Information Configuration Information or Another Structure Includes Both the Downlink Control Parameter or the Downlink Control Parameter Index Number, and the Data Channel Configuration Information or a Data Channel Configuration Information Index Number; or Another Structure Includes Both the Downlink Control Information Configuration Information or the Downlink Control Information Configuration Information Index Number, and the Data Channel Configuration Information or a Data Channel Configuration Information Index Number.

To be specific, when the downlink control information configuration information, the another structure, or other configuration information, configured by using the signaling, includes both the downlink control parameter or the downlink control parameter index number, and the data channel configuration information or the data channel configuration information index number, it indicates that the downlink control parameter or a downlink control parameter corresponding to the downlink control parameter index number is associated with the data channel configuration information or data channel configuration information corresponding to the data channel configuration information index number.

Alternatively, when a structure or configuration information, configured by using the signaling, includes both the downlink control information configuration information or the downlink control information configuration information index number, and the data channel configuration information or the data channel configuration information index number, it indicates that the downlink control information configuration information or downlink control information configuration information corresponding to the downlink control information configuration information index number is associated with the data channel configuration information or data channel configuration information corresponding to the data channel configuration information index number. The structure or the configuration information configured by using the signaling may be a downlink dedicated bandwidth part (bandwidth part-Downlink Dedicated, BWP-Downlink Dedicated) or a bandwidth part information element (bandwidth part information element, BWP-information element).

Figure 7A:
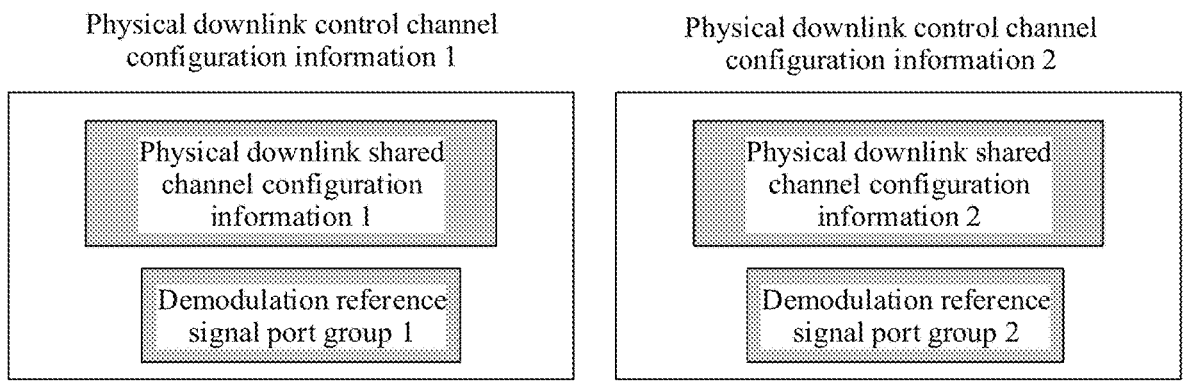
FIG. 7a and FIG. 7b each are a schematic diagram of still another scrambling identifier configuration manner according to an embodiment of this application.
Figure 7B:
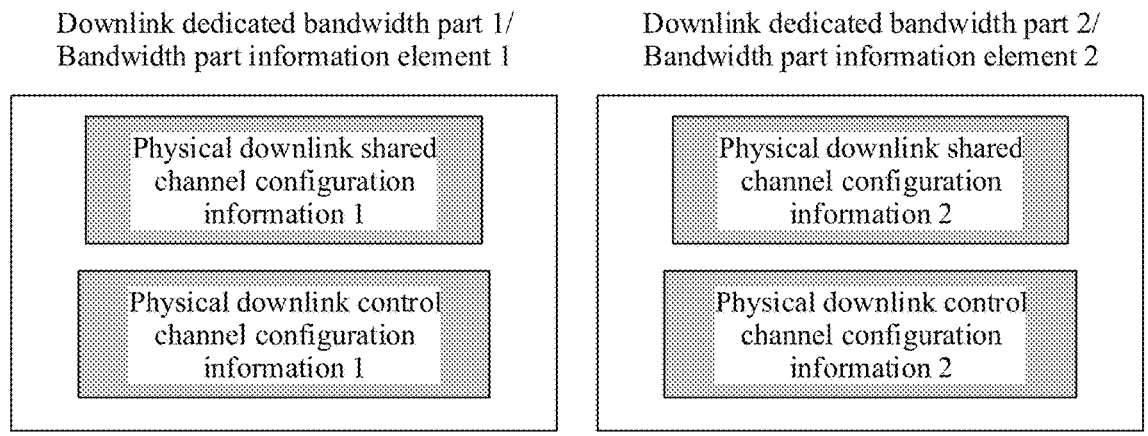

For example, the downlink control information configuration information is the PDCCH-Config, the downlink control parameter is the DMRS port group index number, and the data channel configuration information is the PDSCH-Config. FIG. 7a and FIG. 7b each are a schematic diagram of still another scrambling identifier configuration manner according to an embodiment of this application. As shown in FIG. 7a, a PDCCH-Config 1 includes both a DMRS port group 1 and a PDSCH-Config 1, and it indicates that the DMRS port group 1 is associated with the PDSCH-Config 1; and correspondingly, a PDCCH-Config 2 includes both a DMRS port group 2 and a PDSCH-Config 2, and it indicates that the DMRS port group 2 is associated with the PDSCH-Config 2. As shown in FIG. 7b, a BWP-Downlink Dedicated 1 or a BWP-information element 1 includes both a PDCCH-Config 1 and a PDSCH-Config 1, it indicates that the PDCCH-Config 1 is associated with the PDSCH-Config 1; and a BWP-Downlink Dedicated 2 or a BWP-information element 2 includes both a PDCCH-Config 2 and a PDSCH-Config 2, it indicates that the PDCCH-Config 2 is associated with the PDSCH-Config 2.

Correspondingly, for example, in FIG. 7a, DCI detected by the terminal device is DCI 1, a DMRS port is obtained based on a parameter (for example, an antenna port or an antenna port index number) in the DCI 1, and a DMRS port group obtained based on the DMRS port is the DMRS port group 1. In this case, the terminal device may determine, based on FIG. 7a, that a PDSCH-Config associated with the DMRS port group 1 is the PDSCH-Config 1, and the terminal device may scramble or descramble, by using a scrambling identifier included in the PDSCH-Config 1, data scheduled by using the DCI 1.

2.5 the Downlink Control Information Configuration Information and/or the Downlink Control Parameter and the Data Channel Configuration Information Include a Same Parameter.

To be specific, when the downlink control information configuration information and/or the downlink control parameter and the data channel configuration information include a same parameter, or include a same parameter of a same value, it indicates that the downlink control information configuration information and/or the downlink control parameter are/is associated with the data channel configuration information. To be specific, the downlink control information configuration information and/or the downlink control parameter are/is associated with the scrambling identifier included in the data channel configuration information or a scrambling identifier corresponding to a scrambling identifier index number included in the data channel configuration information.

The same parameter is used to indicate that there is an association relationship between configuration parameters that include the parameter or that include the parameter of the same value, for example, indicate that the configuration parameters are from a same TRP. The parameter may be a downlink dedicated bandwidth part identifier (BWP-DownlinkDedicatedID), an uplink dedicated bandwidth part identifier (BWP-UplinkDedicatedID), a path identifier (PathID), a quasi-colocation identifier (quasi-colocation ID, QCLID), or the like. In conclusion, based on the association relationship in any one of 2.1 to 2.5, at least the following several possible implementations may be included:

The scrambling identifier associated with the downlink control information configuration information is a scrambling identifier included in the downlink control information configuration information, or is a scrambling identifier corresponding to a scrambling identifier index number included in the downlink control information configuration information;

the scrambling identifier associated with the downlink control parameter is a scrambling identifier included in the downlink control information that includes the downlink control parameter, or is a scrambling identifier corresponding to a scrambling identifier index number included in the downlink control information that includes the downlink control parameter;

the scrambling identifier associated with the downlink control parameter is a scrambling identifier included in the downlink control parameter, or is a scrambling identifier corresponding to a scrambling identifier index number included in the downlink control parameter;

the scrambling identifier associated with the downlink control parameter is a scrambling identifier included in a scrambling identifier parameter that includes the downlink control parameter, or is a scrambling identifier corresponding to a scrambling identifier index number included in a scrambling identifier parameter that includes the downlink control parameter;

the scrambling identifier associated with the downlink control information configuration information is a scrambling identifier included in the data channel configuration information associated with the downlink control information configuration information, or is a scrambling identifier corresponding to a scrambling identifier index number included in the data channel configuration information associated with the downlink control information configuration information; or the scrambling identifier associated with the downlink control parameter is a scrambling identifier included in the data channel configuration information associated with the downlink control parameter, or is a scrambling identifier corresponding to a scrambling identifier index number included in the data channel configuration information associated with the downlink control parameter.

In the embodiments of this application, when the terminal device has different capabilities, scrambling identifiers configured by the communications device for the terminal device may also be different. The capability of the terminal device is whether the terminal device supports multi-DCI based non-coherent transmission, whether the terminal device supports receiving of two pieces of DCI in a same time unit (for example, one slot slot), or whether the terminal device supports being configured with a plurality of scrambling identifiers, a plurality of pieces of data channel configuration information, a plurality of pieces of downlink control information configuration information, or the like.

Determining of the scrambling identifier correspondingly changes based on a different capability of the terminal device or a different scenario in which the terminal device is currently located. The following provides descriptions with reference to optional implementations.

In an optional implementation, if the terminal device does not support multi-DCI based non-coherent transmission, the terminal device does not expect to be configured with the plurality of scrambling identifiers. In this case, the network device can configure only one scrambling identifier for the terminal device, and the terminal device does not expect the scrambling identifier to be associated with the downlink control information configuration information or the downlink control parameter.

In another optional implementation, if the terminal device does not support multi-DCI based non-coherent transmission, the terminal device does not expect to be configured with the plurality of scrambling identifiers, and does not expect the association relationship between the one configured scrambling identifier and the downlink control information configuration information or the downlink control parameter. In this case, the network device may configure the one scrambling identifier for the terminal device, and the scrambling identifier has no association relationship with another configuration parameter.

In still another optional implementation, it is assumed that the terminal device does not support multi-DCI based non-coherent transmission, but no limitation is imposed on the network device. In other words, the network device may still configure, for the terminal device by using the foregoing optional implementations, the plurality of scrambling identifiers and the association relationship between each scrambling identifier and each piece of downlink control information configuration information or each downlink control parameter. Correspondingly, the terminal device may select one scrambling identifier from the plurality of scrambling identifiers according to a preset rule. For example, the preset rule is that the terminal device selects a scrambling identifier associated with smaller downlink control information configuration information or a smaller downlink control information configuration information index number; the terminal device selects a scrambling identifier associated with a smaller downlink control parameter or a smaller downlink control parameter index number; or when the network device configures the one scrambling identifier and other scrambling identifiers are generated based on the configured scrambling identifier and according to the preset calculation rule, the terminal device selects the configured scrambling identifier or selects a generated scrambling identifier.

In still another optional implementation, it is assumed that the terminal device does not support multi-DCI based non-coherent transmission, but no limitation is imposed on the network device. In other words, the network device may still configure, for the terminal device by using the foregoing optional implementations, the plurality of scrambling identifiers and the association relationship between each scrambling identifier and each piece of downlink control information configuration information or each downlink control parameter. Correspondingly, the terminal device may still determine the scrambling identifier based on the association relationship.

In an optional implementation, the terminal device supports multi-DCI based non-coherent transmission. When the network device configures only one scrambling identifier, the terminal device does not expect the association relationship between the scrambling identifier and the downlink control information configuration information or the downlink control parameter. In this case, the terminal device directly performs scrambling or descrambling by using the configured scrambling identifier. Alternatively, in this case, the terminal device does not limit the association relationship, and the terminal device may still perform scrambling or descrambling by using the association relationship and the scrambling identifier.

In another optional implementation, the terminal device supports multi-DCI based non-coherent transmission, and the network device configures the plurality of scrambling identifiers for the terminal device.

Assuming that the terminal device is notified that the terminal device is in a multi-DCI based non-coherent transmission scenario, the terminal device or the network device selects the scrambling identifiers based on the association relationship and according to the foregoing embodiments.

Assuming that the terminal device is notified that the terminal device is not in a multi-DCI based non-coherent transmission scenario, that is, the terminal device needs only one scrambling identifier, in an implementation, the terminal device may select the one scrambling identifier according to a preset rule. For example, the preset rule is that the terminal device selects a scrambling identifier associated with smaller downlink control information configuration information or a smaller downlink control information configuration information index number; the terminal device selects a scrambling identifier associated with a smaller downlink control parameter or a smaller downlink control parameter index number; or when the network device configures the one scrambling identifier and other scrambling identifiers are generated based on the configured scrambling identifier and according to the preset calculation rule, the terminal device selects the configured scrambling identifier or selects a generated scrambling identifier. In another implementation, the terminal device may still determine the one scrambling identifier based on the association relationship.

In an optional embodiment, if the terminal device is notified that the terminal device is not in the multi-DCI based non-coherent transmission scenario, the terminal device does not expect to be configured with the plurality of scrambling identifiers. In other words, only one scrambling identifier can be configured for the terminal device. In this case, if the terminal device does not expect to be configured with an association relationship between the plurality of scrambling identifiers and downlink control information configuration information or downlink control parameters, the network device needs to configure only one scrambling identifier for the terminal device, and the terminal device performs scrambling or descrambling by using the scrambling identifier. If the terminal device does not expect to be configured with the plurality of scrambling identifiers only, and the association relationship is not limited, the association relationship may still be retained for the scrambling identifier configured by the communications device for the terminal device.

If the terminal device is notified that the terminal device is not in the multi-DCI based non-coherent transmission scenario, it indicates that the terminal device is definitely not in the scenario in this case. If the terminal device is notified that the terminal device is in the multi-DCI based non-coherent transmission scenario, it indicates that the terminal device may be in the scenario, or may not be in the scenario, but it does not indicate that the terminal device is in the scenario all the time.

It should be understood that the communications device, the network device, and the terminal device in this application may be located in a same communications system, and the communications device configures the one scrambling identifier associated with the downlink control information configuration information or the downlink control parameter, or the plurality of scrambling identifiers associated with the different downlink control information configuration information or downlink control parameters. Values of the scrambling identifiers associated with the different downlink control information configuration information or downlink control parameters may be the same. For example, when a plurality of transmission reception points send same data to a same terminal device, because the same data can improve robustness, a problem of interference randomization does not need to be considered. In this case, values of scrambling identifiers used by the plurality of transmission reception points may be the same. In addition, values of the scrambling identifiers associated with the different downlink control information configuration information or downlink control parameters may be different. For example, when a plurality of transmission reception points send different data to a same terminal device, the problem of interference randomization needs to be considered. In this case, values of scrambling identifiers used by the plurality of transmission reception points may be different. In conclusion, in the solutions described in the embodiments of this application, the one scrambling identifier or the plurality of scrambling identifiers may be configured with reference to the capability of the terminal device and a communication scenario, and the association relationship for the scrambling identifier does not need to be changed. In other words, a configuration architecture of the entire communications system remains unchanged. Therefore, the communications system can be smoothly transited to the application scenario of the plurality of scrambling identifiers, to resolve the problem of interference randomization in the non-coherent joint transmission scenario.

As shown in FIG. 1, the embodiments of this application are described by using an example in which the TRP 1 and the TRP 2 separately transmit the data to the terminal device, and the terminal device has the capability of supporting multi-DCI based non-coherent joint transmission.

Figure 8A:
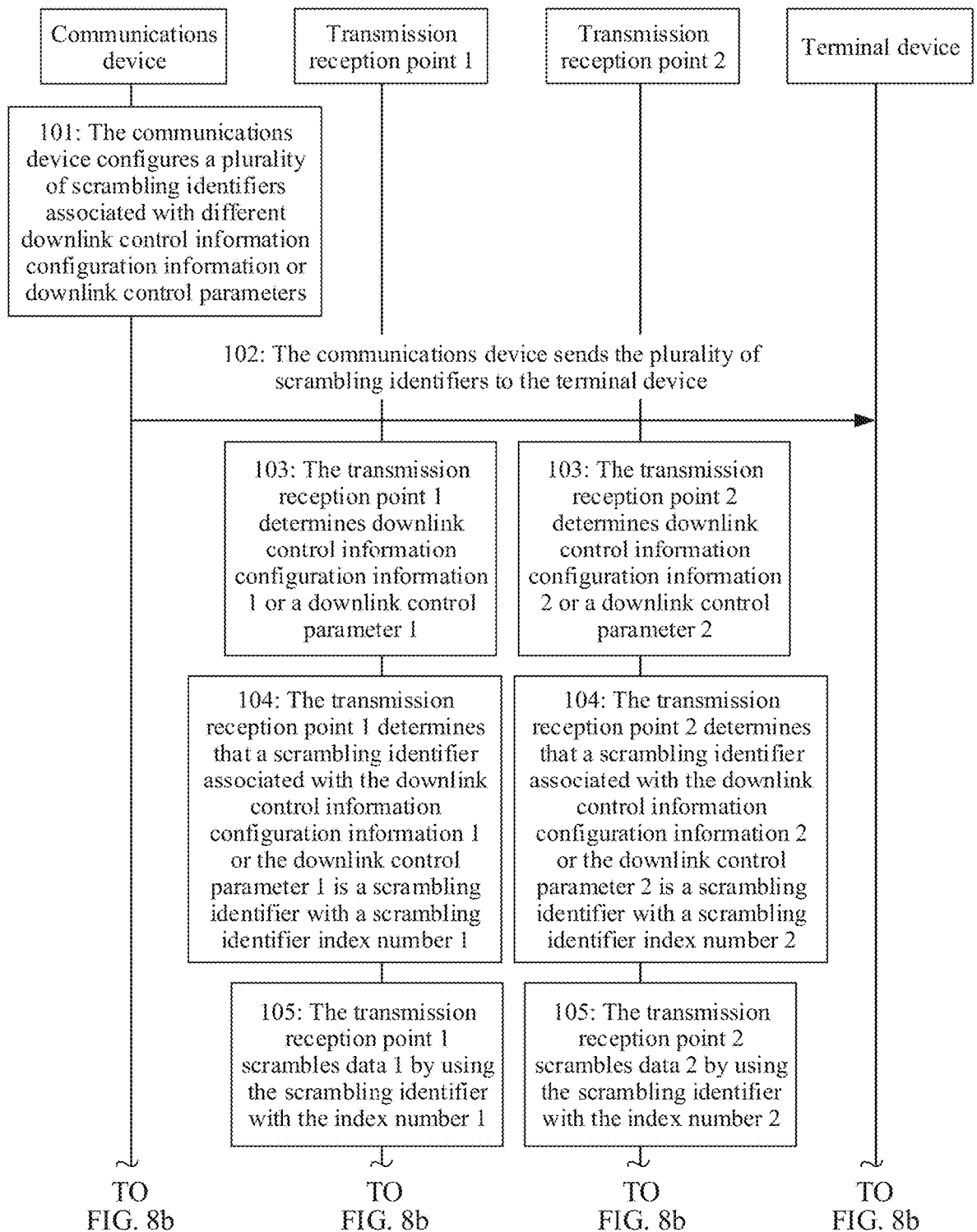
FIG. 8a and FIG. 8b are a schematic flowchart of a data scrambling method according to an embodiment of this application.
Figure 8B:
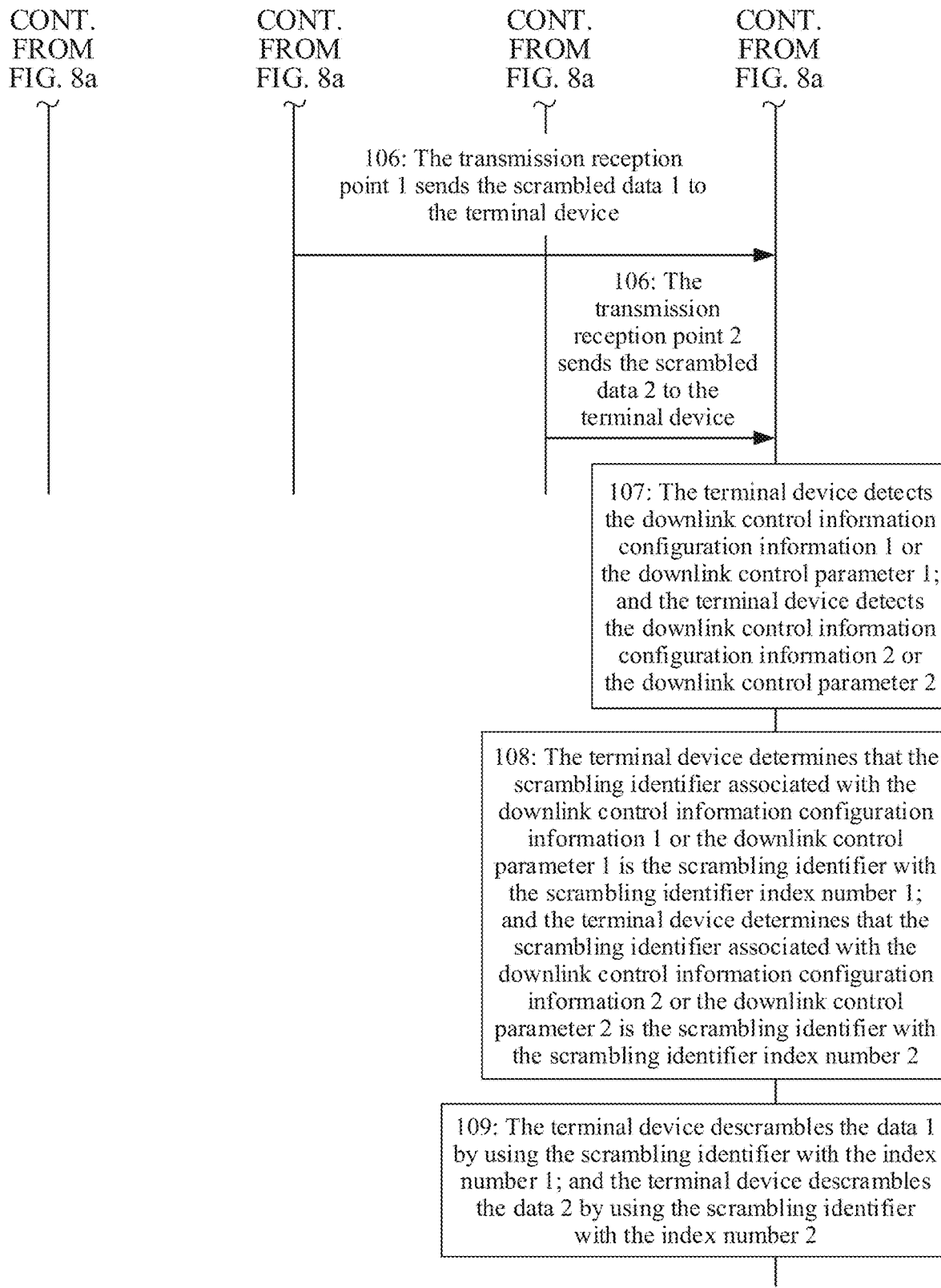

Based on the communications system shown in FIG. 1, FIG. 8a and FIG. 8b are a schematic flowchart of a data scrambling method according to an embodiment of this application. The data scrambling method shown in FIG. 8a and FIG. 8b is described by using downlink data transmission as an example. As shown in FIG. 8a and FIG. 8b, the data scrambling method may include the following steps.

101: A communications device configures a plurality of scrambling identifiers associated with different downlink control information configuration information or downlink control parameters.

In 101, the communications device may configure one scrambling identifier associated with downlink control information configuration information or a downlink control parameter, or a plurality of scrambling identifiers associated with the different downlink control information configuration information or downlink control parameters. In this embodiment of this application, an example in which the plurality of scrambling identifiers associated with the different downlink control information configuration information or downlink control parameters are configured is used, to resolve a problem of interference randomization caused when each TRP transmits different data to a terminal device in non-coherent joint transmission.

In this embodiment of this application, it is assumed that the configured scrambling identifiers, a configured association relationship, configured data channel configuration information, or the configured downlink control information configuration information may be configured by the communications device, and the TRP sends the configured content to the terminal device.

In a possible implementation, the communications device in this embodiment of this application may be a control module or a device, and the TRP is only configured to send or receive related information. In another possible implementation, the communications device may alternatively be a TRP. An example in which the communications device is different from the TRP is used for description in the embodiment shown in FIG. 8a and FIG. 8b.

102: The communications device sends the plurality of scrambling identifiers to the terminal device.

In an optional implementation, that the communications device sends the plurality of scrambling identifiers to the terminal device includes: sending the scrambling identifiers to the terminal device through data channel configuration information. Different data channel configuration information carries different scrambling identifiers.

In another optional implementation, that the communications device sends the one scrambling identifier or the plurality of scrambling identifiers to the terminal device includes: The communications device sends the one scrambling identifier or the plurality of scrambling identifiers to the terminal device through one piece of data channel configuration information.

In this embodiment of this application, after receiving the one scrambling identifier or the plurality of scrambling identifiers sent by the communications device, the terminal device may store the one scrambling identifier or the plurality of scrambling identifiers.

Correspondingly, in an optional implementation, that the terminal device determines the plurality of scrambling identifiers that are configured by the communications device and that are associated with the different downlink control information configuration information or downlink control parameters includes: After receiving a plurality of pieces of data channel configuration information sent by the communications device, the terminal device determines, from the plurality of pieces of data channel configuration information, the plurality of scrambling identifiers associated with the different downlink control information configuration information or downlink control parameters, where each piece of data channel configuration information carries one scrambling identifier.

In another optional implementation, that the terminal device determines the one scrambling identifier that is configured by the communications device and that is associated with the downlink control information configuration information or the downlink control parameter, or the plurality of scrambling identifiers that are configured by the communications device and that are associated with the different downlink control information configuration information or downlink control parameters includes: After receiving one piece of data channel configuration information sent by the communications device, the terminal device determines, from the piece of data channel configuration information, the one scrambling identifier associated with the downlink control information configuration information or the downlink control parameter, or the plurality of scrambling identifiers associated with the different downlink control information configuration information or downlink control parameters.

For an association relationship between the scrambling identifier and the downlink control information configuration information or the downlink control parameter, or an association relationship between the data channel configuration information carrying the scrambling identifier and the downlink control information configuration information or the downlink control parameter, refer to the foregoing implicit configuration manner or explicit configuration manner. Details are not described herein again.

103: A TRP 1 determines downlink control information configuration information 1 or a downlink control parameter 1, and a TRP 2 determines downlink control information configuration information 2 or a downlink control parameter 2.

In an optional implementation, the downlink control information configuration information is determined by another network device, and the TRP 1 and the TRP 2 only use the downlink control information configuration information. When the another network device or a control module determines that the TRP 1 is to transmit data by using the downlink control information configuration information 1 or the downlink control parameter 1, the another network device or the control module may separately notify the TRP 1 to transmit the data by using the downlink control information configuration information 1 or the downlink control parameter 1. Correspondingly, when the another network device or the control module determines that the TRP 2 is to transmit data by using the downlink control information configuration information 2 or the downlink control parameter 2, the another network device or the control module may separately notify the TRP 2 to transmit the data by using the downlink control information configuration information 2 or the downlink control parameter 2. Optionally, the another network device or the control module may alternatively notify the TRP 1 that the TRP 2 is to transmit the data by using the downlink control information configuration information 2 or the downlink control parameter 2, and then the TRP 1 notifies the TRP 2 to transmit the data by using the downlink control information configuration information 2 or the downlink control parameter 2.

In another optional implementation, the downlink control parameters are parameters respectively determined by the TRP 1 and the TRP 2, for example, DMRS port related parameters or transport block TB-related parameters. Therefore, the TRP 1 or the TRP 2 may determine associated scrambling identifiers based on the downlink control parameters respectively determined by the TRP 1 and the TRP 2.

An association relationship between the scrambling identifiers used by the TRP 1 and the TRP 2 is also notified by the communications device to the TRP 1 and the TRP 2.

104: The TRP 1 determines that a scrambling identifier associated with the downlink control information configuration information 1 or the downlink control parameter 1 is a scrambling identifier with a scrambling identifier index number 1; and the TRP 2 determines that a scrambling identifier associated with the downlink control information configuration information 2 or the downlink control parameter 2 is a scrambling identifier with a scrambling identifier index number 2.

In this embodiment of this application, in step 102, the network device may determine, according to any possible implementation in 1.1 to 1.4 and 2.1 to 2.5, the scrambling identifier associated with the downlink control information configuration information or the downlink control parameter.

For example, it is assumed that the configured downlink control parameter 1 is a control parameter related to a TB 1, such as an MCS, an NDI, or an RV, the configured downlink control parameter 2 is a control parameter related to a TB 2, such as an MCS, an NDI, or an RV, and configured association relationships are that the TB 1 is associated with the scrambling identifier with the scrambling identifier index number 1, and the TB 2 is associated with the scrambling identifier with the scrambling identifier index number 2. In this case, in 104 in this embodiment of this application, the scrambling identifier that is associated with the downlink control parameter 1 and that is determined by the TRP 1 is the scrambling identifier with the scrambling identifier index number 1, and the scrambling identifier that is associated with the downlink control parameter 2 and that is determined by the TRP 2 is the scrambling identifier with the scrambling identifier index number 2.

105: The TRP 1 scrambles data 1 by using the scrambling identifier with the scrambling identifier index number 1, and the TRP 2 scrambles data 2 by using the scrambling identifier with the scrambling identifier index number 2.

In this embodiment of this application, the data is data corresponding to downlink control information; and the downlink control information is downlink control information carried on a downlink control channel that is obtained based on the downlink control information configuration information, is downlink control information including the downlink control parameter, or is downlink control information including a parameter related to the downlink control parameter.

Therefore, the data 1 is data corresponding to downlink control information carried on a downlink control channel that is obtained based on the downlink control information configuration information 1; the data 1 is data corresponding to downlink control information including the downlink control parameter 1; or the data 1 is data corresponding to downlink control information including a parameter related to the downlink control parameter 1. Correspondingly, the data 2 is data corresponding to downlink control information carried on a downlink control channel that is obtained based on the downlink control information configuration information 2; the data 2 is data corresponding to downlink control information including the downlink control parameter 2; or the data 2 is data corresponding to downlink control information including a parameter related to the downlink control parameter 2.

106: The TRP 1 sends the scrambled data 1 to the terminal device, and the TRP 2 sends the scrambled data 2 to the terminal device.

107: The terminal device detects the downlink control information configuration information 1 or the downlink control parameter 1, and the terminal device detects the downlink control information configuration information 2 or the downlink control parameter 2. That the terminal device detects the downlink control information configuration information is specifically: The terminal device detects a downlink control channel based on a plurality of pieces of downlink control information configuration information configured by a communications device side for the terminal device, and if detecting a downlink control channel, the terminal device uses, as the detected downlink control information configuration information, downlink control information configuration information based on which the downlink control channel is detected. In other words, the downlink control information configuration information 1 and the downlink control information configuration information 2 that are detected by the terminal device are downlink control information configuration information based on which downlink control channels can be detected.

Correspondingly, that the terminal device detects the downlink control parameter is specifically: The terminal device reads downlink control information carried on the detected downlink control channel, and the terminal device determines the downlink control parameter that is in the downlink control information and that is associated with the scrambling identifier. If the downlink control parameter is a parameter included in the downlink control information, for example, a TB related parameter, the terminal device may directly read the TB related parameter from the downlink control information as the downlink control parameter detected by the terminal device. If the downlink control parameter is a parameter related to a parameter included in the downlink control information, for example, a DMRS port group, the terminal device may directly read an antenna port from the downlink control information, determine a DMRS port based on the antenna port, determine the corresponding DMRS port group based on the DMRS port, and use the determined DMRS port group as the downlink control parameter detected by the terminal device.

108: The terminal device determines that the scrambling identifier associated with the downlink control information configuration information 1 or the downlink control parameter 1 is the scrambling identifier with the scrambling identifier index number 1; and the terminal device determines that the scrambling identifier associated with the downlink control information configuration information 2 or the downlink control parameter 2 is the scrambling identifier with the index number 2.

In this embodiment of this application, the terminal device may determine, according to any possible implementation in 1.1 to 1.4 and 2.1 to 2.5, the scrambling identifier associated with the downlink control information configuration information or the downlink control parameter.

109: The terminal device descrambles the data 1 by using the scrambling identifier with the scrambling identifier index number 1, and the terminal device descrambles the data 2 by using the scrambling identifier with the index number 2.

It should be noted that in the operation steps in this embodiment of this application, operations of the TRP 1 and the TRP 2 do not affect each other. Although the operations are performed in a same step, the operations are not limited to be performed at the same time. For example, the sent data 1 and data 2 may not arrive at the terminal device at the same time, and the terminal device may not process the data 1 and the data 2 at the same time. For example, the terminal device also detects, based on the configured downlink control information configuration information, the DCI sent by each TRP, and there is no limitation on a time at which the DCI sent by each TRP is detected.

A data scrambling method in an uplink data transmission process differs from the data scrambling method in the downlink data transmission process shown in FIG. 8a and FIG. 8b in that the terminal device scrambles uplink data 3 and uplink data 4 respectively by using two obtained scrambling identifiers, and the TRP 1 and the TRP 2 descramble the uplink data 3 and the uplink data 4 respectively by using the obtained scrambling identifiers.

It can be learned that the TRP 1 and the TPR 2 respectively scramble or descramble the data by using the scrambling identifiers associated with the different downlink control information configuration information or downlink control parameters. Correspondingly, the terminal device may scramble or descramble the data by using the different scrambling identifiers. Therefore, the following problem is avoided: When only one unique scrambling identifier can be configured for the same terminal device, interference randomization cannot be implemented when the terminal device performs non-coherent joint transmission.

Figure 9:
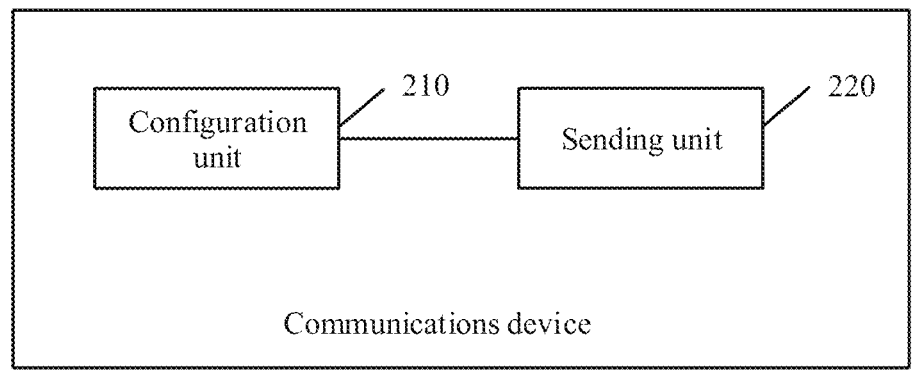
FIG. 9 is a schematic structural diagram of a network device according to an embodiment of this application.

FIG. 9 is a schematic structural diagram of a communications device according to an embodiment of this application. As shown in FIG. 9, the communications device may include a configuration unit 210 and a sending unit 220, where the configuration unit 210 is configured to configure one scrambling identifier associated with downlink control information configuration information or a downlink control parameter, or a plurality of scrambling identifiers associated with different downlink control information configuration information or downlink control parameters, where the downlink control information configuration information is parameter information used to obtain a downlink control channel, and the downlink control parameter is a parameter included in downlink control information or a parameter related to a parameter included in downlink control information; and the sending unit 220 is configured to send the one scrambling identifier or the plurality of scrambling identifiers to a terminal device.

In an optional implementation, that the sending unit sends the plurality of scrambling identifiers to the terminal device is specifically: sending the scrambling identifiers to the terminal device through data channel configuration information.

Different data channel configuration information carries different scrambling identifiers.

In another optional implementation, that the sending unit sends the one scrambling identifier or the plurality of scrambling identifiers to the terminal device is specifically: sending the one scrambling identifier or the plurality of scrambling identifiers to the terminal device through one piece of data channel configuration information.

When the configuration unit configures the one scrambling identifier associated with the downlink control information configuration information or the downlink control parameter, the configured scrambling identifier is further used to generate one or more other scrambling identifiers with reference to a preset calculation rule.

In an optional implementation, an association relationship between the scrambling identifier and the downlink control information configuration information or the downlink control parameter is predefined, or is configured by using at least one of radio resource control RRC signaling, downlink control information DCI signaling, and media access control control element MAC-CE signaling.

For the predefined association relationship between the scrambling identifier and the downlink control information configuration information, refer to related content in the method embodiments. Details are not described herein again.

In an optional implementation, the data channel configuration information carrying the scrambling identifier is associated with the downlink control information configuration information or the downlink control parameter; and an association relationship between the data channel configuration information and the downlink control information configuration information or the downlink control parameter is predefined, or is configured by using at least one of radio resource control RRC signaling, downlink control information DCI signaling, and media access control control element MAC-CE signaling.

For the predefined association relationship between each piece of data channel configuration information and each piece of downlink control information configuration information, refer to related content in the foregoing method embodiments. Details are not described herein again.

Figure 10:
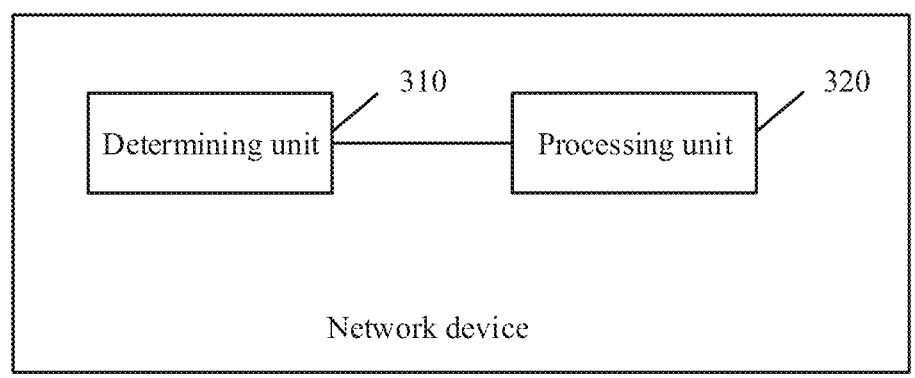
FIG. 10 is a schematic structural diagram of another network device according to an embodiment of this application.

FIG. 10 is a schematic structural diagram of a network device according to an embodiment of this application. The communications device shown in FIG. 9 is mainly configured to configure the scrambling identifier and the corresponding association relationship. The network device shown in FIG. 10 is mainly configured to scramble or descramble data by using the scrambling identifier configured in the embodiments of this application. Therefore, units shown in FIG. 9 and FIG. 10 may be located in a same network device, or may be located in different network devices. This is not limited in the embodiments of this application.

As shown in FIG. 10, the network device may include a determining unit 310 and a processing unit 320, where
the determining unit 310 is configured to determine downlink control information configuration information or a downlink control parameter;
the determining unit 310 is further configured to determine a scrambling identifier associated with the downlink control information configuration information or the downlink control parameter, where different downlink control information configuration information or different downlink control parameters are associated with different scrambling identifiers; and
the processing unit 320 is configured to scramble or descramble data by using the scrambling identifier, where
the data is data corresponding to downlink control information; the downlink control information is downlink control information carried on a downlink control channel that is obtained based on the downlink control information configuration information, is downlink control information including the downlink control parameter, or is downlink control information including a parameter related to the downlink control parameter;
the downlink control information configuration information is parameter information used to obtain the downlink control channel; and the downlink control parameter is a parameter included in the downlink control information or a parameter related to a parameter included in the downlink control information.

In an optional implementation, for that the determining unit 310 determines the scrambling identifier associated with the downlink control information configuration information or the scrambling identifier associated with the downlink control parameter, refer to the explicit configuration manner or the implicit configuration manner in the foregoing method embodiments.

For example, the scrambling identifier associated with the downlink control information configuration information is a scrambling identifier included in the downlink control information configuration information, or is a scrambling identifier corresponding to a scrambling identifier index number included in the downlink control information configuration information; the scrambling identifier associated with the downlink control parameter is a scrambling identifier included in the downlink control information that includes the downlink control parameter, or is a scrambling identifier corresponding to a scrambling identifier index number included in the downlink control information that includes the downlink control parameter; the scrambling identifier associated with the downlink control parameter is a scrambling identifier included in the downlink control parameter, or is a scrambling identifier corresponding to a scrambling identifier index number included in the downlink control parameter; or the scrambling identifier associated with the downlink control parameter is a scrambling identifier included in a scrambling identifier parameter that includes the downlink control parameter, or is a scrambling identifier corresponding to a scrambling identifier index number included in a scrambling identifier parameter that includes the downlink control parameter.

For another example, the scrambling identifier associated with the downlink control information configuration information is a scrambling identifier included in data channel configuration information associated with the downlink control information configuration information, or is a scrambling identifier corresponding to a scrambling identifier index number included in data channel configuration information associated with the downlink control information configuration information; or the scrambling identifier associated with the downlink control parameter is a scrambling identifier included in data channel configuration information associated with the downlink control parameter, or is a scrambling identifier corresponding to a scrambling identifier index number included in data channel configuration information associated with the downlink control parameter.

Figure 11:
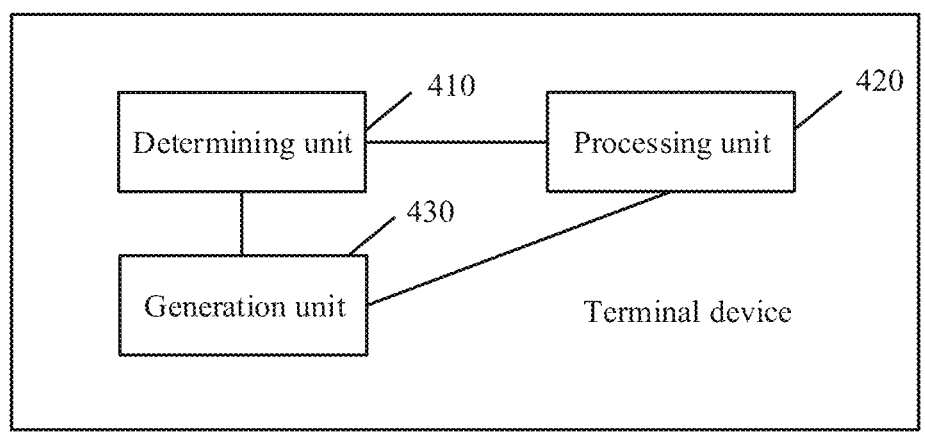
FIG. 11 is a schematic structural diagram of a terminal device according to an embodiment of this application.

FIG. 11 is a schematic structural diagram of a terminal device according to an embodiment of this application. As shown in FIG. 11, the terminal device may include a determining unit 410 and a processing unit 420, where
the determining unit 410 is configured to determine one scrambling identifier that is configured by a communications device and that is associated with downlink control information configuration information or a downlink control parameter, or a plurality of scrambling identifiers that are configured by a communications device and that are associated with different downlink control information configuration information or downlink control parameters; and the processing unit 420 is configured to scramble or descramble data by using the scrambling identifier associated with the downlink control information configuration information or the downlink control parameter, where the data is data scheduled by using downlink control information; the downlink control information is downlink control information carried on a downlink control channel that is obtained based on the downlink control information configuration information, is downlink control information including the downlink control parameter, or is downlink control information including a parameter related to the downlink control parameter;

the downlink control information configuration information is parameter information used to obtain the downlink control channel; and the downlink control parameter is a parameter included in the downlink control information or a parameter related to a parameter included in the downlink control information.

In an optional implementation, that the determining unit 410 determines the plurality of scrambling identifiers that are configured by the communications device and that are associated with the different downlink control information configuration information or downlink control parameters is specifically: after a plurality of pieces of data channel configuration information sent by a communications device are received, determining, from the plurality of pieces of data channel configuration information, the plurality of scrambling identifiers associated with the different downlink control information configuration information or downlink control parameters, where each piece of data channel configuration information carries one scrambling identifier, and different data channel configuration information carries different scrambling identifiers.

In an optional implementation, that the determining unit 410 determines the one scrambling identifier that is configured by the communications device and that is associated with the downlink control information configuration information or the downlink control parameter, or the plurality of scrambling identifiers that are configured by the communications device and that are associated with the different downlink control information configuration information or downlink control parameters is specifically: after one piece of data channel configuration information sent by a communications device is received, determining, from the piece of data channel configuration information, the one scrambling identifier associated with the downlink control information configuration information or the downlink control parameter, or the plurality of configured scrambling identifiers associated with the different downlink control information configuration information or downlink control parameters.

An association relationship between the scrambling identifier and the downlink control information configuration information or the downlink control parameter is predefined, or is configured by using at least one of radio resource control RRC signaling, downlink control information DCI signaling, and media access control control element MAC-CE signaling.

For the predefined association relationship between the scrambling identifier and the downlink control information configuration information or the downlink control parameter, refer to related content in the method embodiments. Correspondingly, for another configuration manner of the association relationship, refer to related content described in 1.1 to 1.4 and 2.1 to 2.5 in the foregoing method embodiments. Details are not described herein again.

In an optional implementation, the data channel configuration information carrying the scrambling identifier is associated with the downlink control information configuration information or the downlink control parameter; and an association relationship between the data channel configuration information and the downlink control information configuration information or the downlink control parameter is predefined, or is configured by using at least one of radio resource control RRC signaling, downlink control information DCI signaling, and media access control control element MAC-CE signaling.

For the predefined association relationship between the data channel configuration information and the downlink control information configuration information or the downlink control parameter, refer to related content in the method embodiments. Correspondingly, for another configuration manner of the association relationship, refer to related content described in 1.1 to 1.4 and 2.1 to 2.5 in the foregoing method embodiments. Details are not described herein again.

the terminal device further includes a generation unit 430, configured to: when the determining unit 410 determines the one scrambling identifier that is configured by the communications device and that is associated with the downlink control information configuration information or the downlink control parameter, generate one or more other scrambling identifiers based on the configured scrambling identifier and according to a preset calculation rule.

In an optional implementation, that the processing unit 420 scrambles or descrambles the data by using the scrambling identifier associated with the downlink control information configuration information or the downlink control parameter is specifically:

determining the downlink control information configuration information or the downlink control parameter;

determining the scrambling identifier associated with the downlink control information configuration information or the scrambling identifier associated with the downlink control parameter; and scrambling or descrambling the data by using the scrambling identifier.

In an optional implementation, for that the processing unit 420 determines the scrambling identifier associated with the downlink control information configuration information or the scrambling identifier associated with the downlink control parameter, refer to related content in the foregoing method embodiments. Details are not described herein again.

Figure 12:
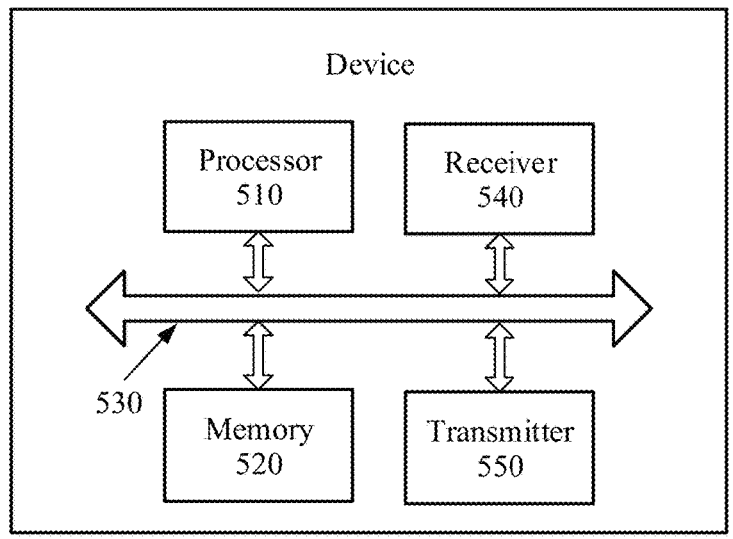
FIG. 12 is a schematic diagram of a device according to an embodiment of this application.

According to the foregoing methods, FIG. 12 is a schematic diagram of a device according to an embodiment of this application. As shown in FIG. 12, the device may be the terminal device shown in FIG. 11, or may be a chip or a circuit, for example, a chip or a circuit that can be disposed in the terminal device. The device may correspond to an operation related to the terminal device in the foregoing methods.

The device may include a processor 510 and a memory 520. The memory 520 is configured to store an instruction, and the processor 510 is configured to execute the instruction stored in the memory 520, to implement a step performed by the foregoing terminal device, or implement an operation related to each unit in the terminal device shown in FIG. 11.

Further, the device may further include a receiver 540 and a transmitter 550. Further, the device may further include a bus system 530. The processor 510, the memory 520, the receiver 540, and the transmitter 550 may be connected through the bus system 530.

The processor 510 is configured to execute the instruction stored in the memory 520, to control the receiver 540 to receive a signal and control the transmitter 550 to send a signal, to complete the step of the terminal device in the foregoing methods, for example, receiving one or more pieces of data channel configuration information configured by a communications device, or sending scrambled data. The receiver 540 and the transmitter 550 may be a same physical entity or different physical entities. If being a same physical entity, the receiver 540 and the transmitter 550 may be collectively referred to as a transceiver. The memory 520 may be integrated in the processor 510, or may be disposed separately from the processor 510.

In addition, the memory 520 is further configured to store one scrambling identifier that is configured by the communications device for the terminal device and that is associated with downlink control information configuration information or a downlink control parameter, a plurality of scrambling identifiers that are configured by the communications device for the terminal device and that are associated with different downlink control information configuration information or downlink control parameters, an association relationship between the scrambling identifier and the downlink control information configuration information or the downlink control parameter, or an association relationship between the data channel configuration information and the downlink control information configuration information or the downlink control parameter.

In an implementation, functions of the receiver 540 and the transmitter 550 may be implemented by using a transceiver circuit or a dedicated transceiver chip. The processor 510 may be implemented by using a dedicated processing chip, a processing circuit, a processor, or a general-purpose chip.

In another implementation, the terminal device provided in this embodiment of this application may be implemented by using a general-purpose computer. To be specific, program code for implementing functions of the processor 510, the receiver 540, and the transmitter 550 is stored in the memory. The general-purpose processor implements the functions of the processor 510, the receiver 540, and the transmitter 550 by executing the code in the memory. For example, the processor 510 invokes the program code in the memory 520, to perform the following operations:

determining one scrambling identifier that is configured by a communications device and that is associated with downlink control information configuration information or a downlink control parameter, or a plurality of scrambling identifiers that are configured by a communications device and that are associated with different downlink control information configuration information or downlink control parameters; and scrambling or descrambling data by using the scrambling identifier associated with the downlink control information configuration information or the downlink control parameter, where the data is data scheduled by using downlink control information; the downlink control information is downlink control information carried on a downlink control channel that is obtained based on the downlink control information configuration information, is downlink control information including the downlink control parameter, or is downlink control information including a parameter related to the downlink control parameter;

the downlink control information configuration information is parameter information used to obtain the downlink control channel; and the downlink control parameter is a parameter included in the downlink control information or a parameter related to a parameter included in the downlink control information.

The processor 510 may further invoke the program code in the memory 520 to perform another operation performed by the terminal device in the foregoing method embodiments. In other words, for concepts, explanations, detailed descriptions, and other steps related to the device and related to the technical solutions provided in the embodiments of this application, refer to descriptions about the content in the foregoing method or other embodiments. Details are not described herein again.

Figure 13:
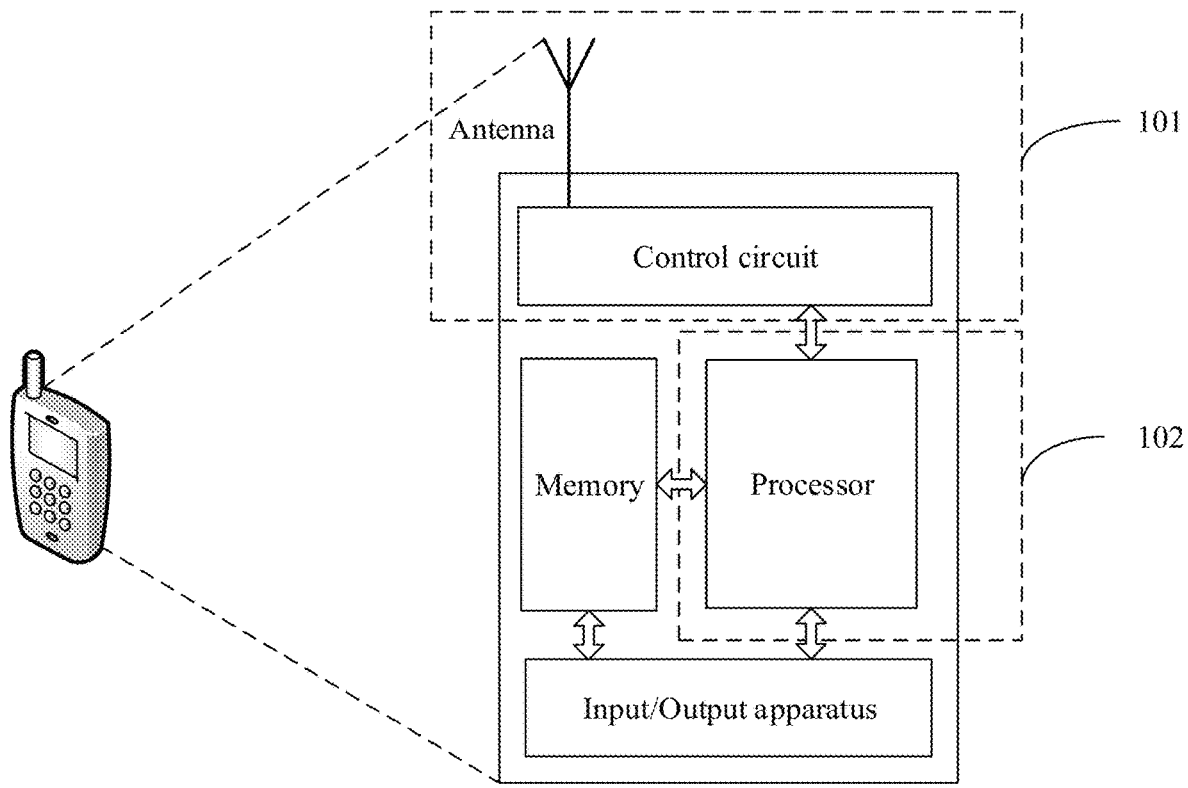
FIG. 13 is a schematic structural diagram of a terminal device according to an embodiment of this application.

FIG. 13 is a schematic structural diagram of a terminal device according to an embodiment of this application. The terminal device may be applied to the system shown in FIG. 1. For ease of description, FIG. 13 shows only main components of the terminal device. As shown in FIG. 13, the terminal device 13 includes a processor, a memory, a control circuit, an antenna, and an input/output apparatus. The processor is mainly configured to: process a communication protocol and communication data; control the entire terminal device; execute a software program; and process data of the software program. For example, the processor is configured to support the terminal device in performing an action described in the embodiment of the data scrambling method. The memory is mainly configured to store the software program and the data, for example, store the downlink control information configuration information, the downlink control parameter, the plurality of scrambling identifiers, and the association relationship between each scrambling identifier and each piece of downlink control information configuration information or each downlink control parameter that are described in the foregoing embodiments. The control circuit is mainly configured to: perform conversion between a baseband signal and a radio frequency signal, and process the radio frequency signal. A combination of the control circuit and the antenna may be referred to as a transceiver, mainly configured to send and receive a radio frequency signal in an electromagnetic wave form, for example, receive related information configured by a communications device, receive data sent by a network device, or send uplink data. The input/output apparatus, such as a touchscreen, a display screen, or a keyboard, is mainly configured to receive data input by a user and output data to the user.

After the terminal device is powered on, the processor may read the software program in a storage unit, explain and execute an instruction of the software program, and process the data of the software program, for example, perform an operation related to the terminal device in the foregoing method embodiments. In a process of performing the operation related to the terminal device in the foregoing method embodiments, when data needs to be sent in a wireless manner, the processor performs baseband processing on to-be-sent data, and then outputs a baseband signal to a radio frequency circuit. After performing radio frequency processing on the baseband signal, the radio frequency circuit sends a radio frequency signal to the outside through the antenna in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 13 shows only one memory and one processor. An actual terminal device may include a plurality of processors and a plurality of memories. The memory may also be referred to as a storage medium, a storage device, or the like. This is not limited in the embodiments of the present invention.

In an optional implementation, the processor may include a baseband processor and a central processing unit. The baseband processor is mainly configured to process the communications protocol and the communications data. The central processing unit is mainly configured to control the entire terminal device, execute the software program, and process the data of the software program. The processor in FIG. 13 integrates functions of the baseband processor and the central processing unit. A person skilled in the art may understand that the baseband processor and the central processing unit may alternatively be independent processors, and are interconnected by using technologies such as a bus. A person skilled in the art may understand that the terminal device may include a plurality of baseband processors to adapt to different network standards, the terminal device may include a plurality of central processing units to improve a processing capability of the terminal device, and the components of the terminal device may be connected by using various buses. The baseband processor may also be expressed as a baseband processing circuit or a baseband processing chip. The central processing unit may also be expressed as a central processing circuit or a central processing chip. The function of processing the communications protocol and the communications data may be built in the processor; or may be stored in the storage unit in a form of a software program, where the processor executes the software program to implement a baseband processing function.

For example, in this embodiment of the present invention, the antenna that has a sending and receiving function and the control circuit may be considered as a communications unit or a transceiver unit of the terminal device, and the processor that has a processing function may be considered as a determining unit or a processing unit of the terminal device. As shown in FIG. 13, the terminal device includes a transceiver unit 101 and a processing unit 102. The transceiver unit may also be referred to as a transceiver, a transceiver machine, a transceiver apparatus, or the like. Optionally, a component that is in the transceiver unit 101 and that is configured to implement a receiving function may be considered as a receiving unit, and a component that is in the transceiver unit 101 and that is configured to implement a sending function may be considered as a sending unit. In other words, the transceiver unit 101 includes the receiving unit and the sending unit. For example, the receiving unit may also be referred to as a receiving machine, a receiver, a receiving circuit, or the like, and the sending unit may be referred to as a transmit machine, a transmitter, a transmit circuit, or the like.

Figure 14:
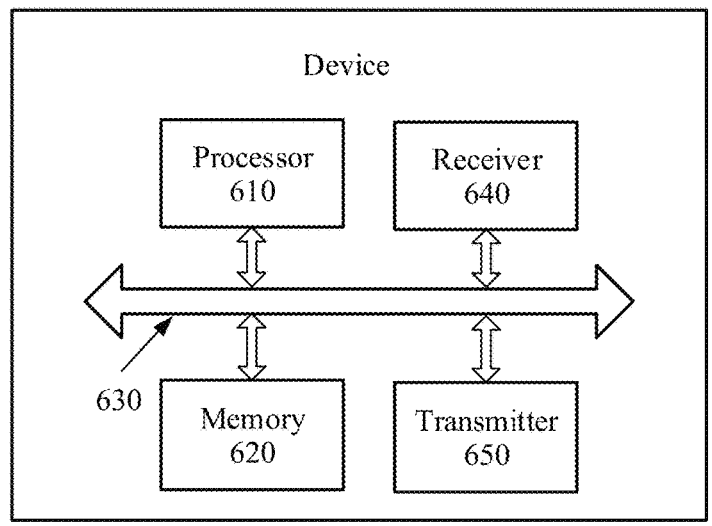
FIG. 14 is a schematic structural diagram of another device according to an embodiment of this application.

According to the foregoing methods, FIG. 14 is a schematic structural diagram of another device according to an embodiment of this application. As shown in FIG. 14, the device may be a communications device or a network device, for example, the communications device shown in FIG. 9 or the network device shown in FIG. 10. The device may alternatively be a chip or a circuit, for example, a chip or a circuit that can be disposed in the communications device shown in FIG. 9 or the network device shown in FIG. 10. The device performs an operation related to the communications device or the TRP in the foregoing methods. The device may include a processor 610 and a memory 620. The memory 620 is configured to store an instruction, and the processor 610 is configured to execute the instruction stored in the memory 620, to enable the device to implement the operation related to the foregoing network device, for example, in the scrambling identifier configuration method and/or the data scrambling method.

Further, the network device may further include a receiver 640 and a transmitter 650. Further, the network may further include a bus system 630.

The processor 610, the memory 620, the receiver 640, and the transmitter 650 are connected through the bus system 630. The processor 610 is configured to execute the instruction stored in the memory 620, to control the receiver 640 to receive a signal and control the transmitter 650 to send the signal, to complete a step of the network device in the foregoing methods. The receiver 640 and the transmitter 650 may be a same physical entity or different physical entities. If being a same physical entity, the receiver 640 and the transmitter 650 may be collectively referred to as a transceiver. The memory 620 may be integrated in the processor 610, or may be disposed separately from the processor 610.

In an implementation, functions of the receiver 640 and the transmitter 650 may be implemented by using a transceiver circuit or a dedicated transceiver chip. The processor 610 may be implemented by using a dedicated processing chip, a processing circuit, a processor, or a general-purpose chip.

In another implementation, the communications device or the network device provided in this embodiment of this application may be implemented by using a general-purpose computer. To be specific, program code for implementing functions of the processor 610, the receiver 640, and the transmitter 650 is stored in the memory. The general-purpose processor executes the code in the memory to implement the functions of the processor 610, the receiver 640, and the transmitter 650. For example, through invoking the program code in the memory 620, or through the receiver 640 and the transmitter 650, the processor 610 may perform related operations of the configuration unit, the sending unit, and the like in the embodiment shown in FIG. 9, perform related operations of the determining unit and the processing unit in the embodiment shown in FIG. 10, or perform related operations or implementations performed by each network device in the foregoing method embodiments.

For concepts, explanations, detailed descriptions, and other steps related to the device and related to the technical solutions provided in this embodiment of this application, refer to related descriptions of the content in the foregoing method or other embodiments. Details are not described herein again.

Figure 15:
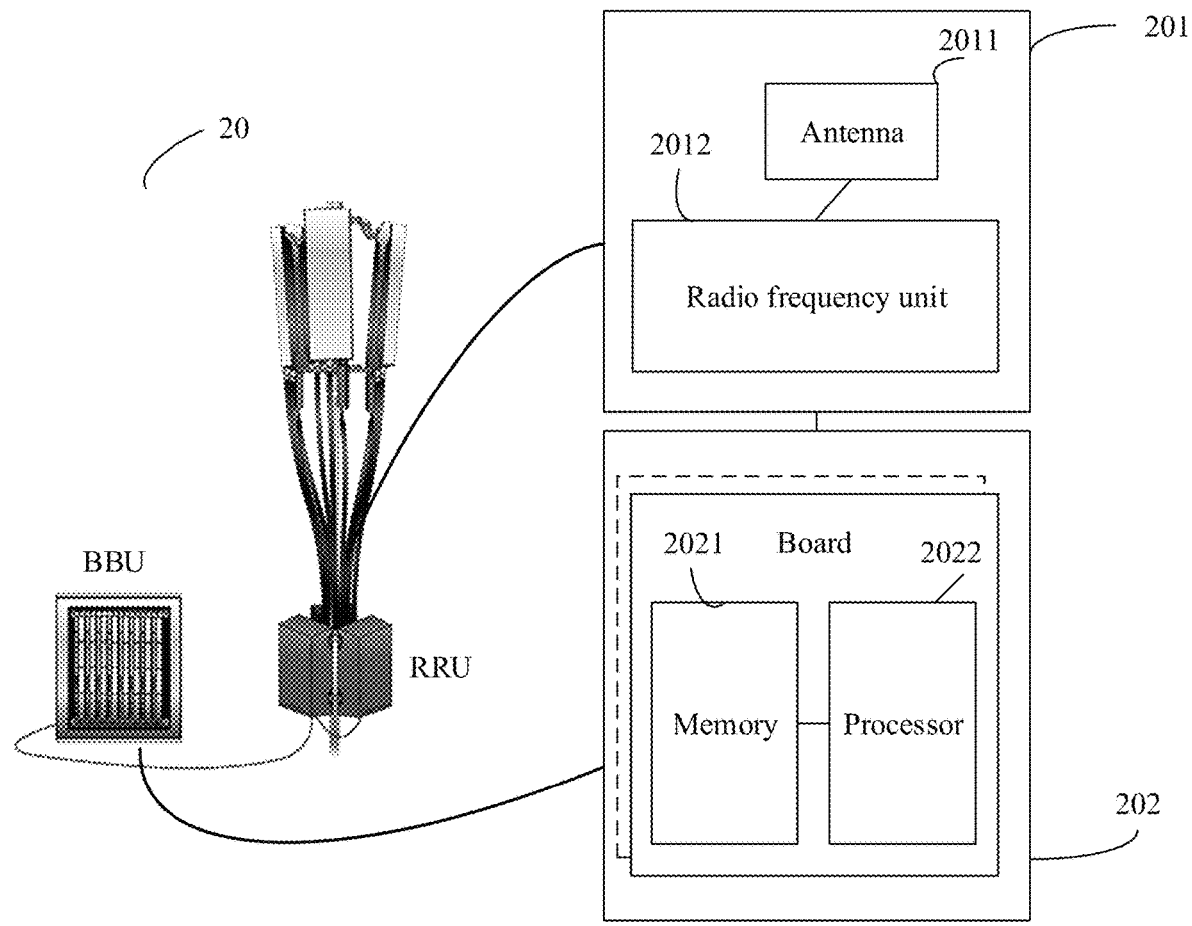
FIG. 15 is a schematic structural diagram of a network device according to an embodiment of this application.

FIG. 15 is a schematic structural diagram of a network device according to an embodiment of this application. The network device may be a base station, and can send related control information and configuration information to a terminal device, receive and send data, or perform other operations. FIG. 15 is described by using a structure of a base station as an example. As shown in FIG. 15, the base station may be applied to the system shown in FIG. 1. The base station includes one or more radio frequency units, such as a remote radio unit (remote radio unit, RRU) 201 and one or more baseband units (baseband unit, BBU) (which may also be referred to as a digital unit, digital unit, DU) 202. The RRU 201 may be referred to as a transceiver unit, a transceiver machine, a transceiver circuit, a transceiver, or the like, and may include at least one antenna 2011 and a radio frequency unit 2012. The RRU 201 is mainly configured to send and receive a radio frequency signal and perform conversion between a radio frequency signal and a baseband signal, for example, configured to send, to the terminal device, the downlink control information configuration information, the downlink control parameter, and the related association relationship in the foregoing embodiments. The BBU 202 is mainly configured to perform baseband processing, control the base station, and the like. The RRU 201 and the BBU 202 may be physically disposed together, or may be physically separated, in other words, may be distributed base stations.

The BBU 202 is a control center of the base station, may also be referred to as a processing unit, and is mainly configured to implement a baseband processing function such as channel coding, multiplexing, modulation, and spectrum spreading. For example, the BBU (the processing unit) may be configured to control the base station to perform an operation procedure of the network device in the scrambling identifier configuration method and/or the data scrambling method in the foregoing method embodiments.

In an example, the BBU 202 may include one or more boards. A plurality of boards may jointly support a radio access network (for example, an LTE network) of a single access standard, or may respectively support radio access networks of different access standards. The BBU 202 further includes a memory 2021 and a processor 2022. The memory 2021 is configured to store a necessary instruction and necessary data. For example, the memory 2021 stores the association relationship, the downlink control information configuration information, the downlink control parameter, and the like in the foregoing embodiments. The processor 2022 is configured to control the base station to perform a necessary action, for example, configured to control the base station to perform an operation procedure related to the network device in the foregoing method embodiments. The memory 2021 and the processor 2022 may serve the one or more boards. In other words, a memory and a processor may be disposed on each board. Alternatively, a plurality of boards may share a same memory and a same processor. In addition, a necessary circuit may further be disposed on each board.

According to the methods provided in the embodiments of this application, an embodiment of this application further provides a communications system, including the foregoing network device and one or more terminal devices.

It should be understood that in the embodiments of this application, the processor may be a central processing unit (Central Processing Unit, "CPU" for short), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory may include a read-only memory and a random access memory, and provide an instruction and data to the processor. Apart of the memory may further include a nonvolatile random access memory.

The bus system may further include a power bus, a control bus, a status signal bus, and the like, in addition to a data bus. However, for clear description, various types of buses in the figure are marked as the bus system.

In an implementation process, steps in the foregoing methods can be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the foregoing methods in combination with the hardware of the processor. To avoid repetition, details are not described herein again.

It should further be understood that the "first", "second", "third", and "fourth" and various digital numbers in this specification are merely for differentiation for ease of description, and are not intended to limit the scope of the embodiments of the present invention.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of the present invention.

A person of ordinary skill in the art may be aware that, in combination with various illustrative logical blocks (illustrative logical block) and steps (step) described in the embodiments disclosed in this specification may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of the present invention.

It may be clearly understood by a person skilled in the art that, for convenience and brevity of description, for specific working procedures of the system, apparatus, and units described above, refer to corresponding procedures in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are completely or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A communication apparatus, comprising:
at least one processor;
configured with instructions executable by the at least one processor to perform operations comprising:
configuring a plurality of scrambling identifiers associated with different pieces of downlink control information (DCI) configuration information, wherein each one of the plurality of scrambling identifiers is configured for scrambling data corresponding to one of the different pieces of DCI configuration information, and the DCI configuration information is parameter information used to obtain a downlink control channel; and
sending the plurality of scrambling identifiers to a terminal device through a piece of data channel configuration information via radio resource control (RRC) signaling.

2. The communication apparatus according to claim 1, wherein the DCI configuration information comprises control resource set configuration parameter index number.

3. The communication apparatus according to claim 1, wherein an association relationship between one of the plurality of scrambling identifiers and one of the different pieces of DCI configuration information is predefined.

4. A communication apparatus, comprising:
at least one processor
configured with processor-executable instructions to perform operations comprising:
receiving a plurality of scrambling identifiers through a piece of data channel configuration information via radio resource control (RRC) signaling, wherein each one of the plurality of scrambling identifiers is configured for scrambling data corresponding to one of different pieces of downlink control information (DCI) configuration information, the DCI configuration information is parameter information used to obtain a downlink control channel and each piece of the different pieces of DCI configuration information corresponds to a piece of DCI; and
scrambling or descrambling data, which is scheduled using the piece of the DCI, by using one of the plurality of scrambling identifiers associated with one of the different pieces of DCI configuration information that corresponds to the piece of the DCI.

5. The communication apparatus according to claim 4, wherein the DCI configuration information comprises control resource set configuration parameter index number.

6. The communication apparatus according to claim 4, wherein an association relationship between one of the plurality of scrambling identifiers and one of the different pieces of DCI configuration information is predefined.

7. A method comprising:
receiving a plurality of scrambling identifiers through a piece of data channel configuration information via radio resource control (RRC) signaling, wherein each one of the plurality of scrambling identifiers is configured for scrambling data corresponding to one of different pieces of downlink control information (DCI) configuration information, the DCI configuration information is parameter information used to obtain a downlink control channel and each piece of the different pieces of DCI configuration information corresponds to a piece of DCI; and
scrambling or descrambling data, which is scheduled using the piece of the DCI, by using one of the plurality of scrambling identifiers associated with one of the different pieces of DCI configuration information that corresponds to the piece of the DCI.

8. The method according to claim 7, wherein the DCI configuration information comprises control resource set configuration parameter index number.

9. The method according to claim 7, wherein an association relationship between one of the plurality of scrambling identifiers and one of the different pieces of DCI configuration information is predefined.

10. A non-transitory computer-readable storage medium storing computer instructions for execution by at least one processor to perform operations comprising:
receiving a plurality of scrambling identifiers through a piece of data channel configuration information via radio resource control (RRC) signaling, wherein each one of the plurality of scrambling identifiers is configured for scrambling data corresponding to one of different pieces of downlink control information (DCI) configuration information, the DCI configuration information is parameter information used to obtain a downlink control channel and each piece of the different pieces of DCI configuration information corresponds to a piece of DCI; and scrambling or descrambling data, which is scheduled using the piece of the DCI, by using one of the plurality of scrambling identifiers associated with one of the different pieces of DCI configuration information that corresponds to the piece of the DCI.

11. The non-transitory computer-readable storage medium according to claim 10, wherein the DCI configuration information comprises control resource set configuration parameter index number.

12. The non-transitory computer-readable storage medium according to claim 10, wherein an association relationship between one of the plurality of scrambling identifiers and one of the different pieces of DCI configuration information is predefined.

\* \* \* \* \*

UNITED STATES PATENT AND TRADEMARK OFFICE
CERTIFICATE OF CORRECTION

PATENT NO. : 12,132,589 B2  
APPLICATION NO. : 17/136660  
DATED : October 29, 2024  
INVENTOR(S) : Ge et al.

Page 1 of 1

It is certified that error appears in the above-identified patent and that said Letters Patent is hereby corrected as shown below:

In the Claims

In Column 57, In Line 57, In Claim 1, delete "processor;" and insert -- processor --.

Signed and Sealed this  
Twenty-eighth Day of January, 2025

Coke Morgan Stewart  
*Acting Director of the United States Patent and Trademark Office*